(12) United States Patent
Walz et al.

(10) Patent No.: US 12,104,942 B2
(45) Date of Patent: Oct. 1, 2024

(54) DEFORMABLE SLEEVE WITH SENSORS, MEASUREMENT UNIT CONFIGURED TO BE MOUNTED ON THE SLEEVE, METHOD STORING A PARAMETER ASSOCIATED WITH A BOTTLE ENCASED IN THE SLEEVE AND COMPUTER PROGRAM

(71) Applicant: GWA HYGIENE GMBH, Stralsund (DE)

(72) Inventors: Marcel Walz, Stralsund (DE); Tobias Gebhardt, Rostock (DE)

(73) Assignee: GWA HYGIENE GMBH, Stralsund (DE)

( * ) Notice: Subject to any disclaimer, the term of this patent is extended or adjusted under 35 U.S.C. 154(b) by 373 days.

(21) Appl. No.: 17/613,369

(22) PCT Filed: Mar. 13, 2020

(86) PCT No.: PCT/EP2020/056922
§ 371 (c)(1),
(2) Date: Nov. 22, 2021

(87) PCT Pub. No.: WO2020/233857
PCT Pub. Date: Nov. 26, 2020

(65) Prior Publication Data
US 2022/0307887 A1     Sep. 29, 2022

(30) Foreign Application Priority Data
May 23, 2019  (EP) .................................. 19176221

(51) Int. Cl.
*G01F 23/263* (2022.01)
*A47K 5/12* (2006.01)
(Continued)

(52) U.S. Cl.
CPC .......... *G01F 23/266* (2013.01); *A47K 5/1201* (2013.01); *A47K 5/1208* (2013.01); *A47K 5/122* (2013.01); *G01N 27/221* (2013.01)

(58) Field of Classification Search
CPC .... G01F 23/266; G01F 23/268; G01F 23/804; G01F 23/263; A47K 5/1201; A47K 5/1208; A47K 5/122; G01N 27/221
See application file for complete search history.

(56) References Cited

U.S. PATENT DOCUMENTS 4,749,988 A * 6/1988 Berman ................ G01F 23/268
                                                  73/304 C
5,790,409 A   8/1998 Fedor et al.
(Continued)

FOREIGN PATENT DOCUMENTS

CH       706634 A1    12/2013
CH       706677 A1    12/2013
(Continued)

OTHER PUBLICATIONS

Applicant: GWA Hygiene GMBH; "Deformable Sleeve with Sensors, Measurement Unit Configured to be Mounted on the Sleeve, Method of Storing a Parameter Associated with a Bottle Encased in the Sleeve and Computer Program"; PCT International Application No. PCT/EP2020/056922 Filing Date: Mar. 13, 2020; PCT International Search Report and Written Opinion; Jun. 8, 2020; 16 pgs.

*Primary Examiner* — Bob Zadeh
(74) *Attorney, Agent, or Firm* — Tarolli, Sundheim, Covell & Tummino LLP

(57) ABSTRACT

A deformable sleeve (100) is provided configured to at least partially encase a bottle from which a liquid is dispensable upon pressing the sleeve (100), the sleeve (100) comprising a first sensor (7) configured to measure a force applied onto the sleeve (100) and a second sensor (8) configured to measure a permittivity of a content encased by the sleeve (Continued)

(100). In addition, a measurement unit (300) is provided configured to be mounted on the sleeve (100), the measurement unit (300) comprising a processing unit (37) configured to determine at least one parameter associated with the bottle based on at least one of a signal of the first sensor (7) and a signal of the second sensor (8). A corresponding method of retrievably storing the at least one parameter is also provided.

17 Claims, 17 Drawing Sheets

(51) Int. Cl.
*A47K 5/122* (2006.01)
*G01N 27/22* (2006.01)

(56) References Cited

U.S. PATENT DOCUMENTS

| | | |
|---|---|---|
| 5,912,818 A | 6/1999 | McGrady et al. |
| 5,993,046 A | 11/1999 | McGrady et al. |
| 6,112,502 A | 9/2000 | Frederick et al. |
| 6,470,234 B1 | 10/2002 | McGrady |
| 7,303,080 B2 | 12/2007 | Mallett et al. |
| 7,467,093 B1 | 12/2008 | Newton et al. |
| 7,515,988 B1 | 4/2009 | Frederick et al. |
| 7,639,136 B1 | 12/2009 | Wass et al. |
| 7,685,026 B1 | 3/2010 | McGrady et al. |
| 7,978,083 B2 | 7/2011 | Melker et al. |
| 8,056,817 B2 | 11/2011 | Flood |
| 8,195,328 B2 | 6/2012 | Mallett et al. |
| 8,204,620 B2 | 6/2012 | Mallett et al. |
| 8,423,180 B1 | 4/2013 | Frederick et al. |
| 8,810,260 B1* | 8/2014 | Zhou .................. G01F 23/265 |
| | | 73/304 C |
| 8,868,434 B2 | 10/2014 | Mallett |
| 9,000,930 B2 | 4/2015 | Pelland et al. |
| 9,613,519 B2 | 4/2017 | Iseri et al. |
| 10,042,984 B2 | 8/2018 | Zaima et al. |
| 2002/0128957 A1 | 9/2002 | Rosenberg et al. |
| 2006/0259377 A1 | 11/2006 | McGrady et al. |
| 2008/0316045 A1 | 12/2008 | Sriharto et al. |
| 2010/0094581 A1 | 4/2010 | Cagle |
| 2015/0134357 A1* | 5/2015 | Davis .................. G06Q 30/018 |
| | | 705/2 |
| 2015/0235546 A1* | 8/2015 | Stapleford .......... G08B 21/182 |
| | | 73/304 C |
| 2015/0268656 A1* | 9/2015 | Bammer ................. A61M 5/24 |
| | | 700/231 |
| 2018/0029290 A1* | 2/2018 | Bottiglio .................. H05K 1/16 |
| 2018/0206682 A1 | 7/2018 | Robinson |
| 2018/0242860 A1 | 8/2018 | Leboeuf et al. |
| 2022/0307887 A1* | 9/2022 | Walz ..................... G01F 23/266 |

FOREIGN PATENT DOCUMENTS

| | | | |
|---|---|---|---|
| CH | 714088 A2 | 2/2019 | |
| CN | 202236844 U | 5/2012 | |
| CN | 106713452 A | 5/2017 | |
| CN | 207506851 U | 12/2017 | |
| CN | 207090025 U | 3/2018 | |
| DE | 102013006494 A1 | 10/2014 | |
| EP | 2037399 A1 | 3/2009 | |
| EP | 1478320 B1 | 1/2017 | |
| EP | 3316189 A1 | 5/2018 | |
| EP | 2511889 B1 | 6/2018 | |
| KR | 20140018957 A | 2/2014 | |
| WO | 2010121276 A1 | 10/2010 | |
| WO | 2013190017 A1 | 12/2013 | |
| WO | WO-2013190016 A1 * | 12/2013 | ........... A47K 5/1201 |
| WO | 2014060726 A1 | 4/2014 | |
| WO | 2018212536 A1 | 11/2018 | |
| WO | 2018215220 A1 | 11/2018 | |

* cited by examiner

| Time-stamp | Device ID | First Force Sensor | Second Force Sensor | First Permittivity Sensor | Second Permittivity Sensor | Permittivity Sensor Empty/Full /Used | Fluid Type | Dispensed Fluid amount | Fluid left | Orientation of Sleeve | Event |
|---|---|---|---|---|---|---|---|---|---|---|---|
| 2019-05-04 22:00:01:120 | AA:BB:CC :DD:EE:FF | 1300mV | 1300mV | 55pF | 55pF | Used | Disinfectant | 1.5ml | 80ml | Down | Use |
| 2019-05-04 23:04:55:010 | AA:BB:CC :DD:EE:FF | 0mV | 0mV | 15pF | 16pF | Used | Disinfectant | 0ml | 80ml | Up | Calibration |
| 2019-05-04 23:04:55:010 | AA:BB:CC :DD:EE:FF | 1300mV | 100mV | 17pF | 16pF | Used | Disinfectant | 0ml | 80ml | Side | False positive |

DEFORMABLE SLEEVE WITH SENSORS, MEASUREMENT UNIT CONFIGURED TO BE MOUNTED ON THE SLEEVE, METHOD STORING A PARAMETER ASSOCIATED WITH A BOTTLE ENCASED IN THE SLEEVE AND COMPUTER PROGRAM

CROSS-REFERENCE TO RELATED APPLICATIONS

This application is a U.S. National Stage Application filed under 35 U.S.C. § 371 of PCT/EP2020/056922, filed Mar. 13, 2020, and entitled "DEFORMABLE SLEEVE WITH SENSORS, MEASUREMENT UNIT CONFIGURED TO BE MOUONTED ON THE SLEEVE, METHOD OF STORING A PARAMETER ASSOCIATED WITH A BOTTLE ENCASED IN THE SLEEVE AND COMPUTER PROGRAM", which International Application claims the benefit of priority from European Patent Application No. 19176221.0, filed on May 23, 2019. The entire contents of each of the above-identified patent applications are incorporated herein by reference.

TECHNICAL FIELD

The current disclosure relates to a deformable sleeve with sensors, a measurement unit configured to be mounted on the sleeve, a method of storing a parameter associated with a bottle encased in the sleeve and a computer program.

BACKGROUND

In many locations such as hospitals and food production facilities, hygiene is of the utmost importance. To minimize spreading of germs, bacteria and dirt, hands of or gloves worn by personnel working in the aforementioned environments need regular cleansing and disinfection. Fixed soap dispensers and disinfectors for hand disinfection are commonly used for this purpose. Use of these disinfectors may be tracked and associated with a certain user. This enables personalized monitoring of hand hygiene.

In most hospitals, clinicians and other personnel additionally carry personal disinfection bottles, often in pockets of their gowns. Instead of or in addition to the personal disinfection bottles, other liquids such as soap may be carried in personal bottles and used by clinicians and other personnel. In these cases, users might refrain from using fixed disinfectors or soap dispensers and instead use their personal bottles. Therefore, tracking only the fixed disinfectors or soap dispensers cannot always provide reliable results concerning hand hygiene of a particular user. Also, it cannot be reliably determined whether and when a personal bottle needs to be replaced by a new one or refilled.

SUMMARY

It is an object of the present disclosure to provide a solution which enables personalized monitoring of use of a bottle from which a liquid can be dispensed.

According to a first aspect, a deformable sleeve is provided which is configured to at least partially encase a bottle from which a liquid is dispensable upon pressing the sleeve, the sleeve comprising a first sensor configured to measure a force applied onto the sleeve and a second sensor configured to measure a permittivity of a content encased by the sleeve.

The bottle may be portable. It may contain a certain amount of liquid such as a disinfectant, a soap, a solution comprising disinfectant, a solution comprising soap or else.

The sleeve may be part of an integrated system configured to store a first measurement of the first sensor and a second measurement of the second sensor in a dataset. For example, the integrated system comprises a processing unit configured to store the measurements in a dataset, for example in a storage unit comprised in the integrated system.

In one example, the first sensor is configured to measure the force applied onto the sleeve by a user's hand when the user is at least one of holding the sleeve in the hand and deforming the sleeve so as to dispense the liquid from the bottle. The first sensor may comprise two first electrodes separated from one another by a gap. The two first electrodes may lie in the same plane. The two first electrodes may extend in a height direction of the sleeve. The gap may have a meandering form. The electrodes may have a combed form.

In one example, the first sensor comprises a conductive sheet arranged on top of the two first electrodes. The conductive sheet may be configured so as to come in contact with the two first electrodes in case the force applied to the sleeve exceeds a minimum force, for example a predetermined minimum force.

The sleeve may comprise the first sensor two or more times. For example, the sleeve comprises one first sensor on a first side of the sleeve and another first sensor on a second side of the sleeve. The first side and the second side may be sides of the sleeve spaced apart from one another across an opening of the sleeve that is configured to receive the bottle. One first sensor may be configured to measure the force applied onto the first side of the sleeve by a user's hand when the user is at least one of holding the sleeve in the hand and deforming (e.g., pressing) the sleeve so as to dispense the liquid from the bottle. Another first sensor may be configured to measure the force applied onto the second side of the sleeve by a user's hand when the user is at least one of holding the sleeve in the hand and deforming the sleeve so as to dispense the liquid from the bottle. The resulting two sensor signals may be averaged or used to verify one another.

The second sensor may comprise two second electrodes spaced apart from one another. The two second electrodes may be fully or partially molded into the sleeve. For example, the two second electrodes are in indirect contact with a content encased by the sleeve such as air or a bottle. In one variant, each of the two second electrodes is covered by a layer of material such as a part of the sleeve, a protective coating or an adhesive film. For example, electric properties of the layer of material closely match electric properties of a bottle (for example an empty bottle) encased by the sleeve. The two second electrodes may be arranged on an inner surface of the sleeve such that the layer of material covering the two second electrodes contacts a side portion of a bottle encased by the sleeve. At least one of the two second electrodes, for example each of the two second electrodes may be segmented in a height direction of the sleeve into at least two electrode segments. The two second electrodes may lie in the same plane. For example, the two second electrodes lie in a plane essentially parallel to a plane in which the two first electrodes lie.

The sleeve may comprise the second sensor two times. For example, the sleeve comprises the second sensor on a first side of the sleeve and another second sensor on a second side of the sleeve. The first side and the second side may be sides of the sleeve spaced apart from one another across an opening of the sleeve that is configured to receive the bottle. Both of these two second sensors may be arranged so as to come in contact with a bottle inserted into the sleeve. The second electrodes comprised in both second sensors may be arranged such that the second electrodes of the second sensor face the second electrodes of the other second sensor across the opening of the sleeve that is configured to receive the bottle.

The second sensor (e.g., the two second electrodes) are for example arranged electrically isolated from the first sensor (e.g., the two first electrodes) and adjacent to the first sensor. For example, the second sensor (e.g., the two second electrodes) is arranged closer to the opening in the sleeve configured to receive the bottle than the first sensor (e.g., two first electrodes). The first sensor (e.g., the two first electrodes) may be arranged closer to an outer surface of the sleeve than the second sensor (e.g., two second electrodes).

According to a second aspect, a system is provided comprising the sleeve presented herein and a cap configured to close the bottle when the bottle is encased in the sleeve. The cap for example comprises at least one third sensor configured to measure a parameter associated with an amount of a liquid dispensed from the bottle through the cap. The cap may be removably or permanently attached to the sleeve. The system comprising the sleeve and the cap may be a single component. For example, the sleeve and the cap may be part of the same (e.g., molded) molded body.

According to a third aspect, a measurement unit is provided which is configured to be mounted on a sleeve, the sleeve configured to at least partially encase a bottle and comprising at least one of a first sensor and a second sensor, the measurement unit comprising electrical terminals configured to electrically contact at least one of a first electrical contact electrically connected to the first sensor and a second electrical contact electrically connected to the second sensor and a processing unit configured to determine at least one parameter associated with the bottle based on at least one of a signal of the first sensor and a signal of the second sensor. For example, the measurement unit is configured to be mounted on a sleeve, the sleeve configured to at least partially encase a bottle and comprising a first sensor and a second sensor, the measurement unit comprising electrical terminals configured to electrically contact a first electrical contact electrically connected to the first sensor and a second electrical contact electrically connected to the second sensor and a processing unit configured to determine at least one parameter associated with the bottle based on at least one of a signal of the first sensor and a signal of the second sensor, for example based on both the signal of the first sensor and the signal of the second sensor. The parameter is for example a dispensed fluid amount, a measurement value of the first sensor, a measurement value of the second sensor, a fluid type, an amount of fluid left, or an orientation of the bottle.

The measurement unit is for example configured to determine an event associated with the bottle based on the at least one parameter. Based on the parameter, the event may be determined such as a use event describing that the bottle encased by the sleeve has been used to dispense liquid, a calibration event describing that the sleeve was in a calibration condition, a false positive event describing that some parameters indicate a use event while others do not, or else.

The sleeve with the first sensor and the second sensor may be configured as generally described herein. In particular, the first sensor may be a force sensor and the second sensor may be a permittivity sensor. As mentioned above, a third sensor may be comprised by a cap of the bottle. The third sensor may be configured to generate a sensor signal based on which an amount of a liquid dispensed from the bottle through the cap can be determined.

The measurement unit may further comprise a fourth sensor, wherein the processing unit is configured to determine the at least one parameter associated with the bottle based on at least one of a signal of the first sensor, a signal of the second sensor and a signal of the fourth sensor. The fourth sensor is for example configured to measure an orientation of the sleeve. A signal generated by the fourth sensor may be used to determine an orientation of the sleeve as the at least one parameter.

The measurement unit may further comprise a signalling unit configured to generate a signal perceptible by a user based on a control signal, wherein the processing unit is configured to generate the control signal based on the at least one parameter. In one variant, the processing unit is configured to generate the control signal based on the event which is determined based on the at least one parameter. For example, the control signal is an electrical signal which triggers activation of the signalling unit. The control signal may be a power signal supplied to the signalling unit, for example a signal which activates a power supply to the signalling unit.

For example, the processing unit is configured to generate a dataset comprising the at least one parameter, the measurement unit further comprising a storage unit configured to retrievably store the dataset. The processing unit may be configured to include the event determined based on the at least one parameter in the dataset. The measurement unit may further comprise an interface configured to output the dataset. The interface may be a wireless interface (e.g., in accordance with a Near Field, NF, or the Bluetooth communication standard) or a wired interface (e.g., based on the Universal Serial Bus, USB).

According to a fourth aspect, a system comprising the measurement unit is provided, the system further comprising at least one of the sleeve, the sleeve and the bottle, the system according to the second aspect or the system according to the second aspect and the bottle. The measurement unit may be removably or permanently attached to the sleeve. In one example, the system comprising the measurement unit and the sleeve may form a single component. For example, the measurement unit and the sleeve may be part of the same (e.g., molded) molded body. The cap may be removably or permanently attached to the sleeve. The system comprising the measurement unit, the sleeve and the cap may form a single component. For example, the measurement unit, the sleeve and the cap are part of the same (e.g., molded) body. The measurement unit of the third aspect in one variant does not comprise electrical terminals configured to electrically contact at least one of a first electrical contact electrically connected to the first sensor and a second electrical contact electrically connected to the second sensor. In the same or another variant, the sleeve or the single component comprising at least the sleeve and the measurement unit may further comprise the processing unit described above, which is for example configured to determine the at least one parameter associated with the bottle based on at least one of the signal of the first sensor and the signal of the second sensor.

According to a fifth aspect, a method of storing a parameter associated with a bottle encased in a sleeve is provided, the sleeve configured to at least partially encase the bottle. The method comprises at least one of detecting a force applied onto the sleeve, as a first signal, and measuring a permittivity of a content inside the sleeve, as a second signal. The term "detecting" may be equal to "measuring". The method further comprises determining the at least one parameter based on at least one of the first signal and the second signal, generating a dataset comprising the at least one parameter, and retrievably storing the dataset.

In one implementation a total permittivity comprising the permittivity of a first volume inside the sleeve and a superimposed permittivity of a second volume outside the sleeve may be measured. In this case, the step of measuring the permittivity further comprises measuring the permittivity of the second volume outside the sleeve. For example, the first volume corresponds to a volume encased by the sleeve, such as an opening in the sleeve configured to receive the bottle. For example, the second volume extends from an outer surface of the sleeve into a direction opposite from the first volume, such as a direction away from the bottle.

The method (e.g., the step of determining the at least one parameter) for example comprises correcting the second signal based on the first signal, or vice versa. In one variant, a condition is determined based on the first signal. Depending on the condition, the second signal is corrected, for example by subtracting or adding a predetermined value to the second signal. The condition is for example a state of the bottle, such as a state in which a user holds the sleeve encasing the bottle (holding state) or a state in which the bottle is removed from the sleeve. The condition may be determined as an additional parameter associated with the bottle encased in the sleeve.

In one scenario, the permittivity measured by the second sensor may be corrected by a certain amount depending on the measurement of the first sensor. For example, if a user's hand is pressing the sleeve so as to dispense a liquid out of the bottle encased by the sleeve, the first sensor may measure a certain force applied onto the sleeve while the second sensor may measure a permittivity of the content encased by the sleeve and a superimposed permittivity of the user's hand. In order to obtain only the permittivity of the content encased by the sleeve, the superimposed permittivity may be subtracted or compensated otherwise. For example, a predetermined amount of permittivity is subtracted from the total permittivity measured by the second sensor in case it is determined, based on the signal of the first sensor, that a user is pressing the sleeve.

A third signal may be generated by a third sensor, for example the third sensor comprised by the cap mounted on the sleeve. The third sensor may be configured to measure an amount of fluid dispensed from the bottle. A fourth signal may be generated by a fourth sensor, for example a fourth sensor comprised in the measurement unit. The fourth sensor in one variant is configured to measure an orientation of the measurement unit and/or an orientation of the sleeve. The at least one parameter may be determined based on the third signal and/or the fourth signal. The at least one parameter may be corrected based on at least one of the first signal, the second signal, the third signal and the fourth signal. For example, the predetermined parameter is determined based on the second signal and corrected based on the first signal. The corrected parameter may then be used in combination with the second signal, the third signal and/or the fourth signal in order to determine an event associated therewith. The at least one parameter, or the event, may be used to trigger a calibration, a determination of a type of fluid in the bottle and/or a determination of an amount of fluid in the bottle.

In some cases, different parameters are determined based on different ones of the signals. For example, the at least one parameter is determined based on a combination of more than one of the first signal, the second signal, the third signal and the fourth signal. For example, a parameter may be determined based on the second signal and/or the third signal which indicates an amount of fluid which was dispensed from the bottle. The use of several signals to determine a parameter enables an improved reliability of the parameter and may avoid ambiguities.

The event may be determined based on at least two parameters. For example, the event may be determined based on at least the first signal and the second signal. It may be determined based on the first signal, the second signal and the fourth signal. For example, the use event is determined in case each of the first and the second signal fulfils a predetermined criterion, for example lies above or under a predetermined threshold value. In some variants, the use event is also determined based on another parameter such as an orientation of the sleeve which is determined based on the fourth signal. The use event may be determined based on another parameter associated with the state of the bottle and based on the first and/or second signal. In case the other parameter is determined based on the fourth signal, the use event may be determined based on the first, the second and the third signal. The aforementioned determinations may equally apply to other events instead of the use event. For example, based on the at least two parameters, the event is selected from a list of events. For the selection, the at least two parameters may be compared with reference values associated with certain events. Other combinations of input data are possible to determine the event.

According to a sixth aspect, a computer program is provided which, when executed on a processor, causes the processor to perform the method steps of the method according to the fifth aspect. Also provided is a program storage medium on which the program is stored, in particular in a non-transitory form. In addition, a data stream carrying information which represents the program is provided.

BRIEF DESCRIPTION OF THE DRAWINGS

In the following, several embodiments of the present disclosure are described with reference to the figures, wherein

FIG. 17 shows datasets comprising the at least one parameter;

DETAILED DESCRIPTION

Figure 1:
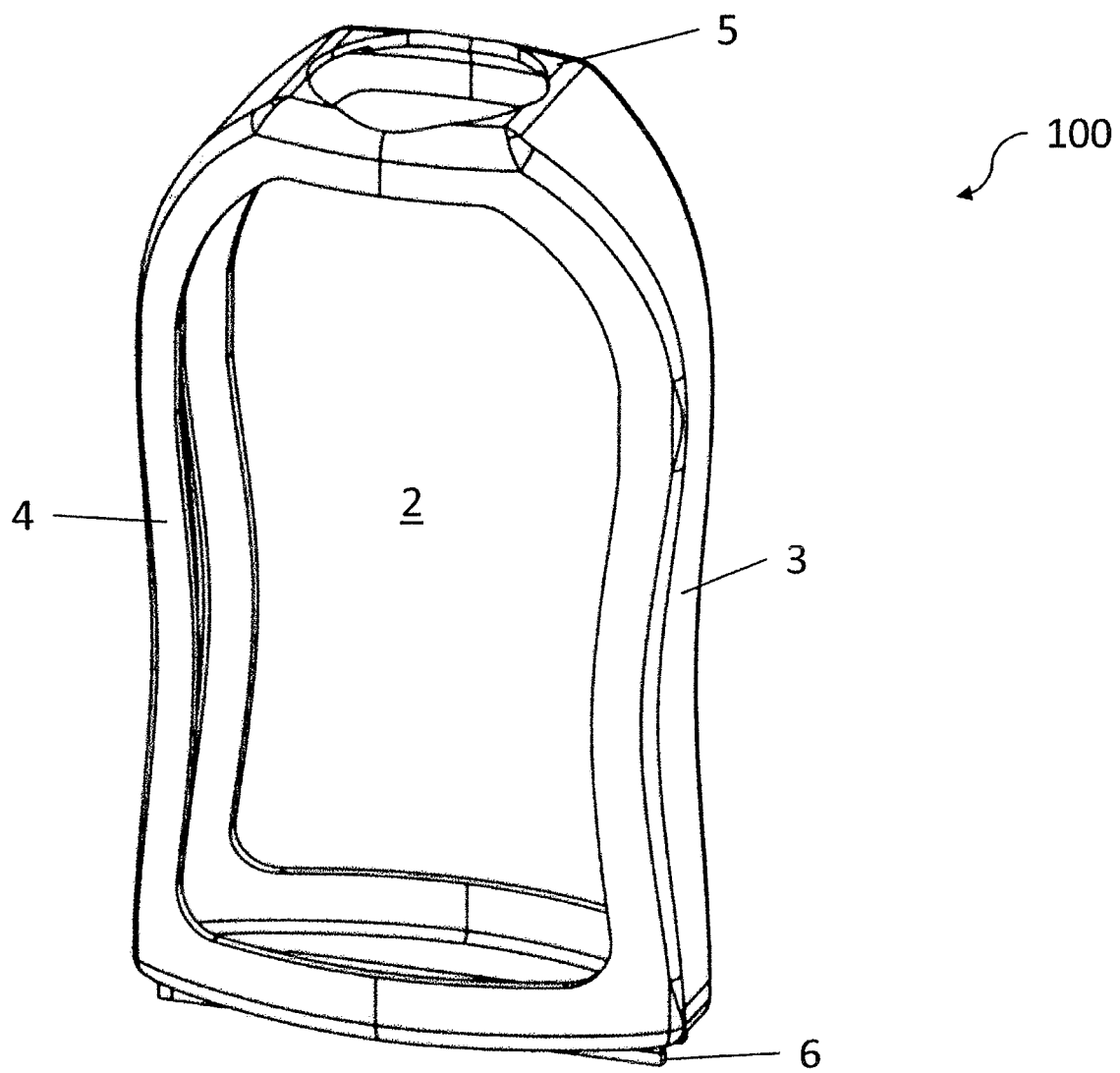
FIG. 1 shows an embodiment of a sleeve.

FIG. 1 shows an embodiment of a deformable sleeve 100 according to an embodiment of the present disclosure. The sleeve 100 is made of a deformable material such as a plastic, for example an elastomer. The sleeve 100 includes an opening 2 which is configured to receive a bottle. That is, the sleeve 100 is configured to at least partially encase a bottle. The sleeve 100 is deformable such that upon pressing the sleeve 100, a liquid is dispensable out of the bottle encased by the sleeve 100. Therefore, the bottle may also be formed of a deformable material, such as plastic. The sleeve 100 comprises a first side portion 3 and a second side portion 4. It also comprises a top portion 5 to which a cap can be mounted (not shown in FIG. 1). Furthermore, the sleeve 100 comprises a bottom portion 6 onto which a measurement unit (not shown in FIG. 1) can be mounted, as will be described below.

Figure 2:
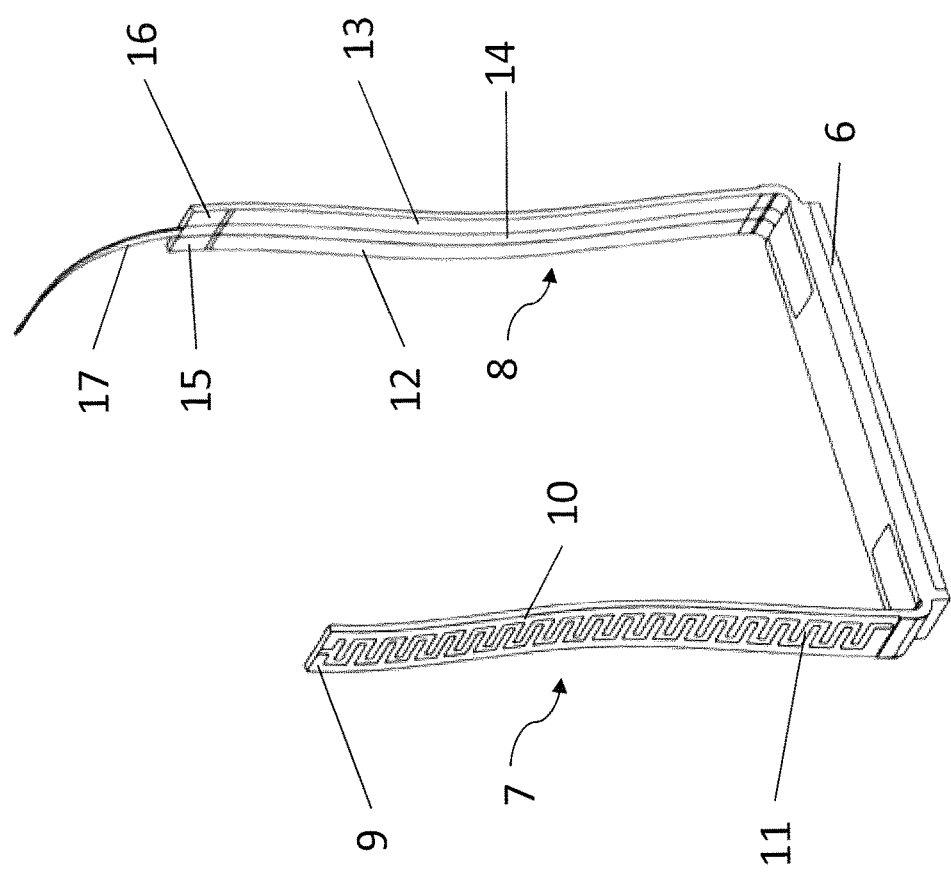
FIG. 2 shows an embodiment of a first sensor and a second sensor.

FIG. 2 shows an embodiment of a first sensor 7, also referred to as force sensor, and a second sensor 8, also referred to as permittivity sensor. These sensors 7, 8 are embedded in the sleeve 100 shown in FIG. 1. For example, the force sensor 7 and the permittivity sensor 8 are partially molded into the sleeve 100. The bottom portion 6 shown in FIG. 2 may correspond to the bottom portion 6 shown in FIG. 1.

The force sensor 7 comprises a first electrode 9 and another first electrode 10. The first electrodes 9 and 10 are separated from one another by a gap 11. The gap shown in FIG. 2 has a meandering form. In other words, the first electrodes 9, 10 each are formed like a comb and arranged so that teeth of the combs mesh with each other. The first electrodes 9, 10 are extending in a height direction of the sleeve 100. The first electrodes 9, 10 extend from the bottom portion 6 toward the top portion 5 of the sleeve 100.

The force sensor 7 is configured to measure a force applied onto the sleeve 100. This function will be described with reference to FIG. 3. The permittivity sensor 8 is configured to measure a permittivity of a space encased by the sleeve 100. In particular, the permittivity sensor 8 is configured to measure a permittivity of a content inside the opening 2 of the sleeve 100.

The permittivity sensor 8 comprises two second electrodes 12 and 13. The second electrodes 12, 13 lie in a common plane and are spaced apart from one another as can be seen in FIG. 2. For example, a strip 14 made of an insulating material which is not electrically conductive can be interposed between the second electrodes 12, 13. The second electrodes 12, 13 extend in a height direction of the sleeve 100. The second electrodes 12, 13 may extend from bottom portion 6 of the sleeve 100 towards top portion 5 of the sleeve 100.

In the shown example, the second electrodes 12, 13 are arranged on an inner surface of the sleeve 100. They are arranged so as to be close to the opening 2 of sleeve 100. They are configured to indirectly contact a side portion of a bottle encased in the opening 2 by the sleeve 100. Disposed on the second electrodes 12, 13 is a layer of material (not shown) such as a protective coating or an adhesive film. Alternatively, the two second electrodes 12, 13 are embedded in the sleeve 100, for example molded into the sleeve 100. In this case, the layer of material is made of the same material as the sleeve 100. The layer of material enables a protection of the two second electrodes 12, 13 against corrosion, moisture and wear. For example, electric properties of the layer of material closely match electric properties of a bottle encased by the sleeve 100. Thus, the measured permittivity is not much influenced by the material of the bottle. The layer of material is thin so that the two second electrodes 12, 13 are as close as possible to a fluid inside a bottle encased by the sleeve 100. This vicinity improves a resolution of the permittivity measurement. The two second electrodes 12, 13 may be arranged on an inner surface of the sleeve 100 such that the layer of material covering the second electrodes 12, 13 contacts a side portion of a bottle encased by the sleeve 100.

One of the second electrodes 12, 13 may be segmented in a height direction of the sleeve 100 into at least two electrode segments. The other of the second electrodes 12, 13 may be segmented in a height direction of the sleeve 100 into at least two electrode segments. That is, each of the second electrodes 12, 13 may be segmented into at least 2 electrode segments.

Figure 18:
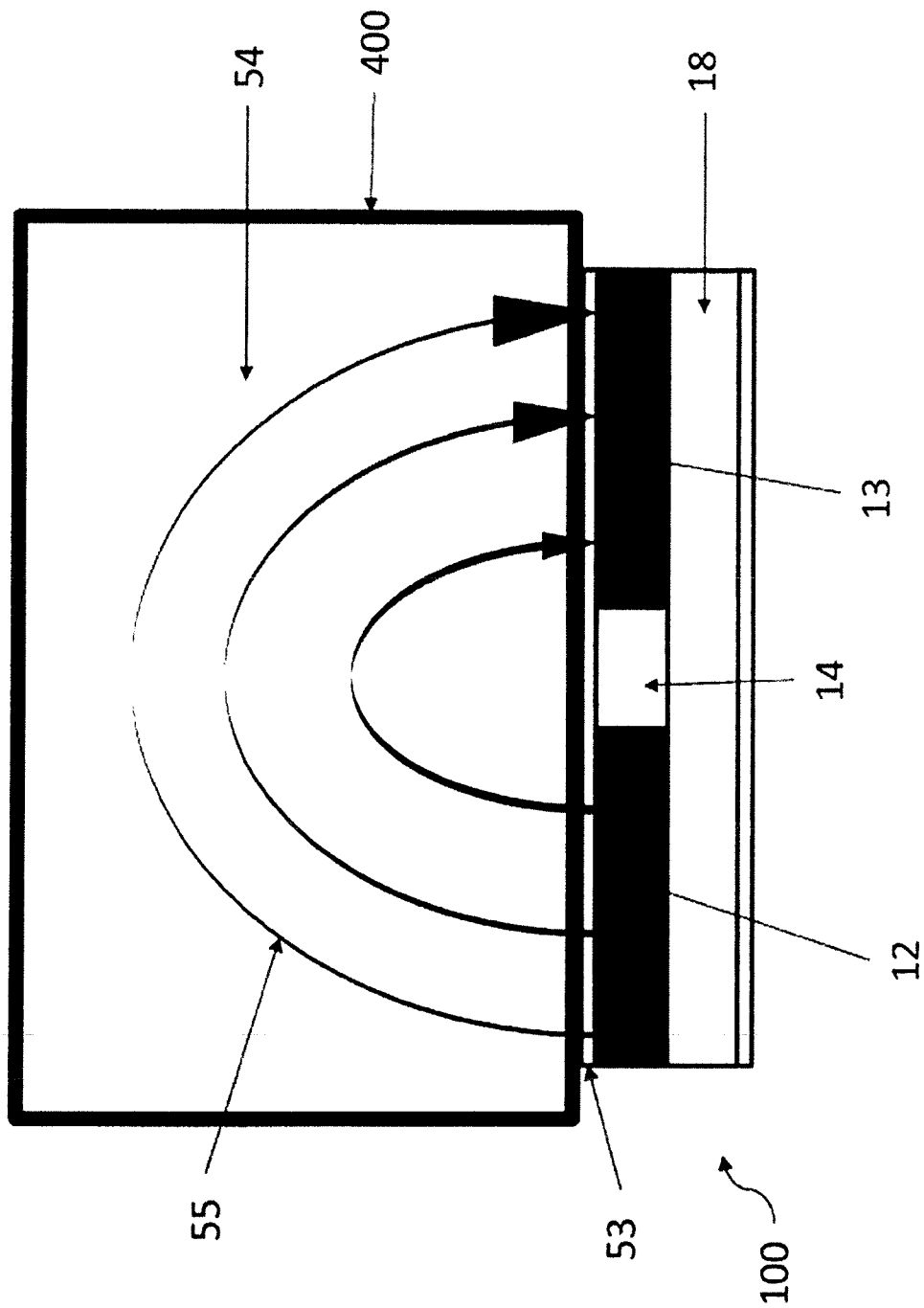
FIG. 18 shows an embodiment of a system comprising a sleeve and a bottle.
Figure 19:
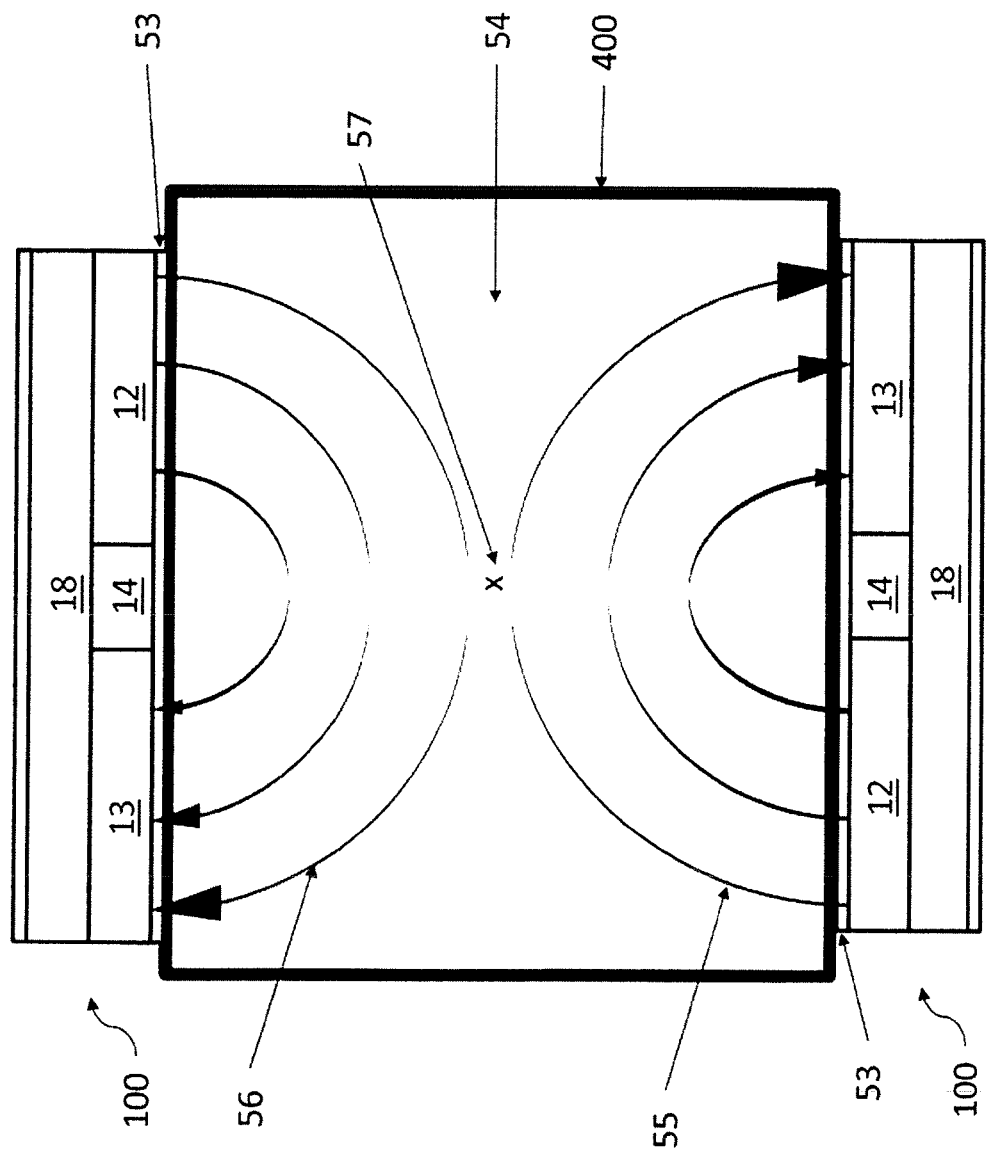
FIG. 19 shows another embodiment of a system comprising a sleeve and a bottle.

The two second electrodes 12, 13 are configured to measure a permittivity between the two second electrodes 12, 13. By applying a voltage between the second electrodes 12, 13, an electrical field is generated in a first volume extending from the second electrodes 12, 13 into the direction of the opening 2 and in a second volume extending from the second electrodes 12, 13 into the opposite direction. The electrical field generated in the first volume is also shown in FIG. 18 and FIG. 19 as will be described below. A permittivity of a content encased by the sleeve 2 can be measured using the electrical field extending in the first volume. A superimposed permittivity of material in the second volume may also be measured with the second electrodes 12, 13.

That is, in addition to measuring a permittivity of a content encased by the sleeve 100, the permittivity sensor 8 may be configured to also measure a permittivity of a second volume outside the sleeve 100. For example, the second volume covers a user's hand when the user is holding the sleeve 100. The second volume may stretch from an outer surface of the sleeve 100 to a few centimetres above the outer surface of the sleeve 100.

The permittivity sensor 8 is configured to measure a total permittivity comprising a permittivity of a content of the sleeve 100 and a permittivity of a second volume outside the sleeve. The total permittivity may comprise a permittivity of the sleeve 100. The total permittivity may be the sum of the permittivity of the content and the permittivity of the second volume. For example, the permittivity sensor 8 is configured to measure a permittivity between the two electrodes 12, 13 at a given location. The permittivity comprises a permittivity of a first volume on one side of the electrodes 12, 13 (as discussed below with reference to FIG. 18 and FIG. 19) and a permittivity of a second volume on the other side of the electrodes 12, 13. The two volumes may differ from one another, depending on the electrode layout and the materials which are present within the volumes. For example, the content is a bottle filled with a disinfectant. For example, the second volume outside the sleeve covers a gripping portion of the sleeve 100 in which a user's hand is present when the user is pressing the sleeve 100 in order to dispense liquid out of the bottle.

The permittivity of the second volume outside the sleeve 100 may be referred to as a superimposed permittivity. That is, the permittivity of the second volume outside the sleeve and the permittivity of the first volume inside the sleeve may add up to a total permittivity which can be sensed by the permittivity sensor 8. Since the permittivity of material in the second volume is in this example also detected using the permittivity sensor 8, the measured total permittivity is influenced by a user's hand which contacts the sleeve 100 or by other surroundings of the sleeve 100 such as a pocket of a gown or air. The measured total permittivity is also influenced by material in the first volume, in other words by content encased by the sleeve 100, as will be discussed below with reference to FIG. 18 and FIG. 19.

This insight enables the detection of a bottle inserted into the opening 2. In particular, permittivity values before and after insertion of a bottle differ from one another, and a comparison of these values can be used to determine that a bottle has been inserted. A permittivity measurement using the permittivity sensor 8 also enables a determination of what form the inserted bottle has and what type of liquid is inside the bottle. Additionally, a filling height of the bottle can be determined using the permittivity measurement. For example, in case electrodes 12, 13, which are each segmented in a height direction of the sleeve 100, are used, different permittivity values can be measured with individual electrode segments. A comparison of the different permittivities enables a determination of the filling height. The type of liquid may be determined by comparing a natural frequency at which the highest permittivity is measured with a list of natural frequencies of known liquids. In addition, the permittivity value at the natural frequency may be used for the comparison. Such comparisons can also be used to determine the form of a bottle encased by the sleeve 100. For example, some of the electrode segments might be in contact with the bottle while others are not. This results in different permittivity values measured by the individual segments. A comparison of the permittivity values measured by individual segments with predetermined permittivity values for individual segments enables a determination of the geometrical form of the inserted bottle.

The second electrodes 12, 13 are arranged electrically isolated from the first electrodes 9, 10 and adjacent to the first electrodes 9, 10. In the example shown in FIG. 2, two entities of the force sensor 7 and two entities of the permittivity sensor 8 are provided. On both side portion 3 and side portion 4 of sleeve 100, a force sensor 7 is disposed, whereas on both an inner side of the side portion 3 and an inner side of the side portion 4, a permittivity sensor 8 is disposed. This results in two combined sensor units, each of which is disposed on a different side portion 3 or 4 of the sleeve 100 and comprises a force sensor 7 and a permittivity sensor 8. The second electrodes 12, 13 of the permittivity sensor 8 disposed on side portion 3 face second electrodes 12, 13 of the additional permittivity sensor 8 which is disposed on side portion 4. The second electrodes 12, 13 might be arranged adjacent to the first electrodes 9, 10.

Two electrode segments 15 and 16 are arranged in proximity to the second electrodes 12, 13. In the shown embodiment, the additional electrodes 15 and 16 are arranged electrically isolated from the second electrodes 12, 13 and spaced apart from the second electrodes 12, 13 in the height direction of the sleeve 100. The electrode segments 15 and 16 are closer to the top portion 5 of sleeve 100 than the second electrodes 12, 13. In the shown example, the additional electrodes 15 and 16 are segments of the second electrodes 12, 13.

An electrode 17 is arranged adjacent to the first sensor 7 or the permittivity sensor 8. In the shown embodiment, the electrode 17 is arranged adjacent to the permittivity sensor 8 and extends from the bottom portion 6 of the sleeve 100 toward the top portion 5 of the sleeve 100. The electrode 17 is configured to contact a third sensor comprised in a cap as will be described later on. For example, the electrode 17 is embedded in the sleeve 100, for example molded into the sleeve 100.

Figure 3:
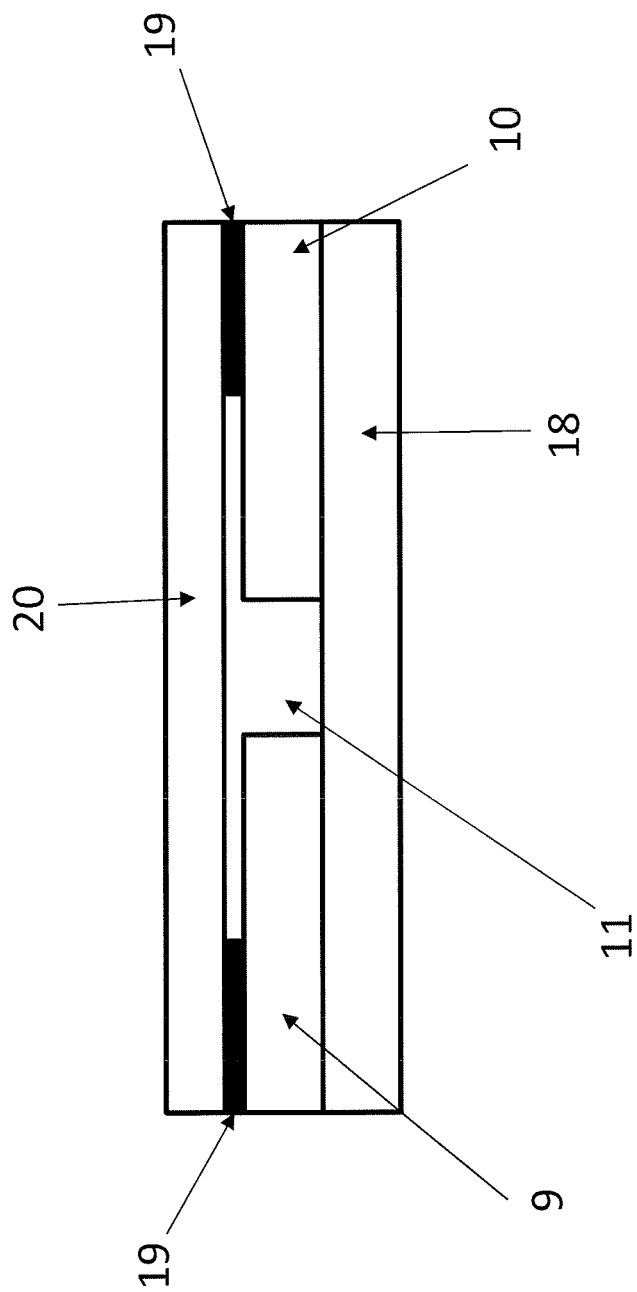
FIG. 3 shows an embodiment of a first sensor.

FIG. 3 schematically illustrates a cross-section of the force sensor 7. As can be seen in FIG. 3, the first electrodes 9, 10 lie in a common plane and are spaced apart from one another by the gap 11. The gap 11 might be filled with air or another electrically isolating material. The electrodes 9, 10 are disposed on a substrate 18. The substrate 18 may be made of a deformable material such as polyamide. On first electrodes 9, 10 a glue 19, which is electrically isolating, is disposed. The glue 19 fixes an electrically conductive sheet 20 onto the electrodes 9, 10. The conductive sheet 20 is arranged on top of the first electrodes 9, 10.

In case a force is applied onto conductive sheet 20, the sheet 20 moves in the direction of the first electrodes 9, 10. If conductive sheet 20 contacts both the first electrode 9 and the first electrode 10, an electrical resistance between the first electrodes 9, 10 decreases. This is because the electrical resistance of the conductive foil 20 is lower than the electrical resistance of the material in the gap 11. In order for the conductive foil 20 to contact both the first electrode 9 and the first electrode 10, a force which exceeds a minimal force needs to be applied onto sleeve 100. By measuring the resistance between the first electrodes 9, 10, for example by measuring a change in a voltage drop across the electrodes 9, 10 or a change in current between the electrodes 9, 10, the force sensor 7 is configured to indirectly measure the force applied onto the sleeve 100 by a user's hand when the user is at least one of holding the sleeve 100 in the hand and deforming the sleeve 100 so as to dispense the liquid from the bottle. The larger the force which is applied onto sleeve 100 and therefore onto conductive sheet 20, the larger is the area of the conductive sheet 20 which is in contact with both electrodes 9, 10. This means that the resistance between the first electrodes 9 at 10 depends on the force applied onto the sleeve 100. In addition, a position of contact can be determined based on the resistance value. That is, the length of a path of current flowing from the first electrode 10 to the first electrode 9 or vice versa through the conductive sheet 20 depends on where the sheet 20 contacts both first electrodes 9, 10.

Figure 4:
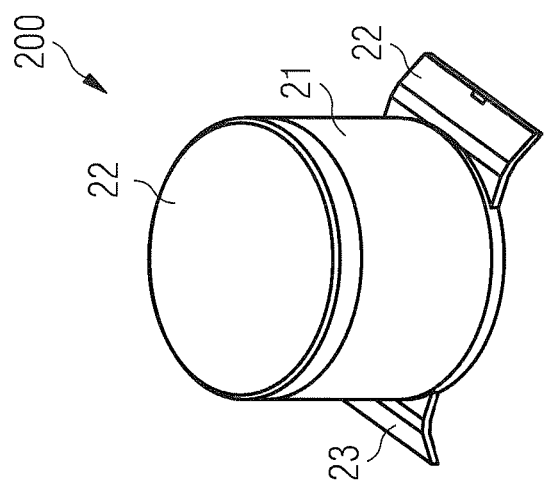
FIG. 4 shows an embodiment of a cap in a closed state.

FIG. 4 shows a cap 200 according to an embodiment of the present disclosure for use with the sleeve of FIG. 1. The cap 200 comprises a cap body 21 and a cap lid 22. The cap 200 further comprises connecting portions 22 and 23 which are configured to removably connect the cap 200 onto top portion 5 of sleeve 100. For example, connecting portion 22 and/or connecting portion 23 contains a magnet arranged so as to be adjacent to a corresponding magnet comprised in sleeve 100 when the cap 200 is mounted onto sleeve 100. Of course, other connecting means might be provided on connecting portion 22 and/or connecting portion 23. For example, a notch or a catch might be provided in order to removably fix the cap 200 onto the sleeve 100. At least one of the connecting portions 22 and 23 might comprise an electrical connector configured to come into contact with the electrode 17 comprised in the sleeve 100. This enables an electrical connection between the cap 200 and the sleeve 100. The cap 200 is configured to close the bottle when the bottle is encased in the sleeve 100.

Figure 5:
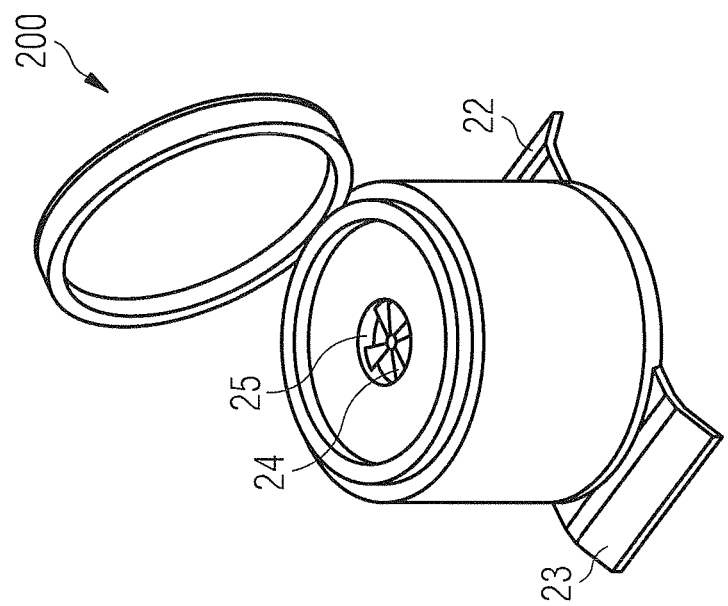
FIG. 5 shows an embodiment of the cap of FIG. 6 in an opened state.

As can be seen in FIG. 5, the cap 200 comprises a third sensor. In the shown example, the third sensor comprises a vane anemometer 24 and is configured to measure a parameter associated with an amount of liquid dispensed from the bottle through the cap 200. Instead of the vane anemometer 24, a hot-wire anemometer may be used. In the shown example, the vane anemometer 24 is configured to measure the speed of a fluid flow through an opening 25 comprised in cap body 21. Due to the opening 25 having predetermined dimensions, the total amount of dispensed liquid can be determined from the fluid flow speed.

Figure 6:
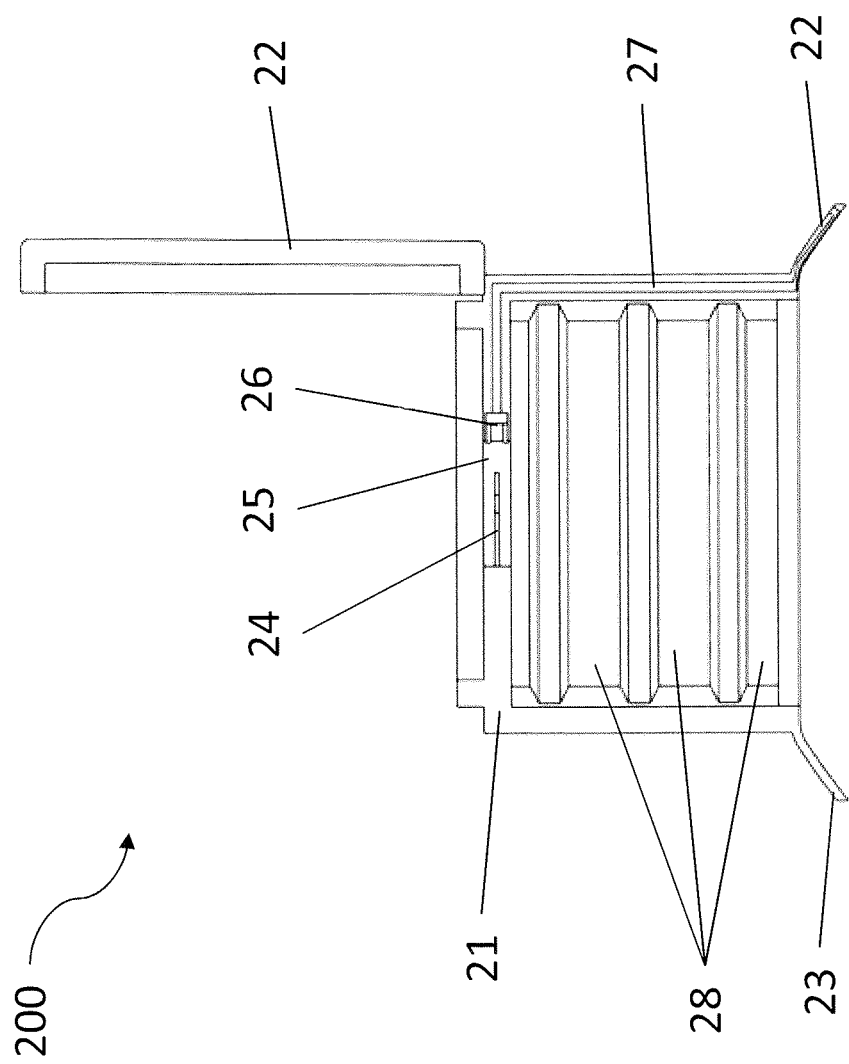
FIG. 6 shows a cross section of an embodiment of a cap in an opened state.

FIG. 6 shows a cross-section of a further embodiment of the cap 200. In the shown embodiment of the cap 200, the third sensor is a differential pressure sensor 26 arranged adjacent to the opening 25 in the cap body 21. Inside the opening 25, a blocking element 24 is provided. The blocking element 24 is dimensioned such that fluid dispensed out of the bottle has to flow adjacent to the differential pressure sensor 26. The blocking element 24 defines a predetermined cross-section through which the fluid can flow out of the opening 25. This enables the determination of an amount of fluid which flows outside of the opening 25 based on a measurement of the differential pressure sensor 26. An electrical connection 27 is provided which connects the third sensor to connecting portion 22.

A threaded portion 28 is disposed inside the cap body 21. The threaded portion 28 is configured to cooperate with and seal a corresponding threaded portion of a neck of a bottle. The threaded portion 28 comprises a flexible material configured to seal different corresponding threaded portions of different bottles. That is, the threaded portion 28 is configured to seal threads of bottles having different thread pitches or tread sizes.

Figure 7:
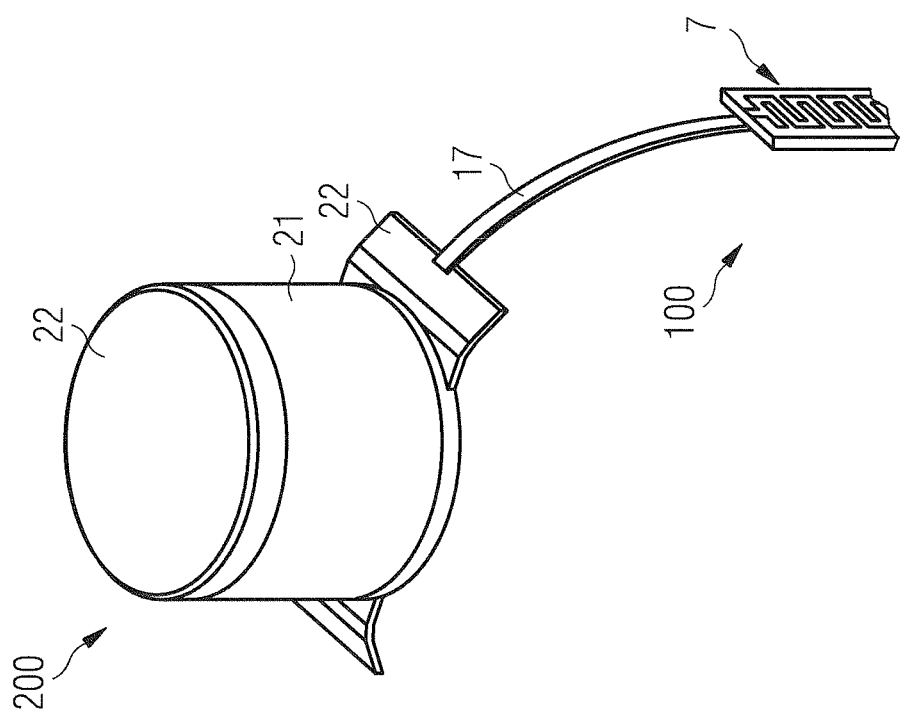
FIG. 7 shows an embodiment of a system comprising a cap and a sleeve.

FIG. 7 shows an embodiment of a system comprising the cap 200 and the sleeve 100. In FIG. 7, only parts of the sleeve 100 are shown. It can be seen that the electrode 17 of the sleeve 100 is connected to the connecting portion 22 of the cap 200. This enables a transmission of a signal from the third sensor comprised in the cap 200 to the sleeve 100. The electrode 17 might extend from the connecting portion 22 to the bottom portion 6 of the sleeve 100.

Figure 8:
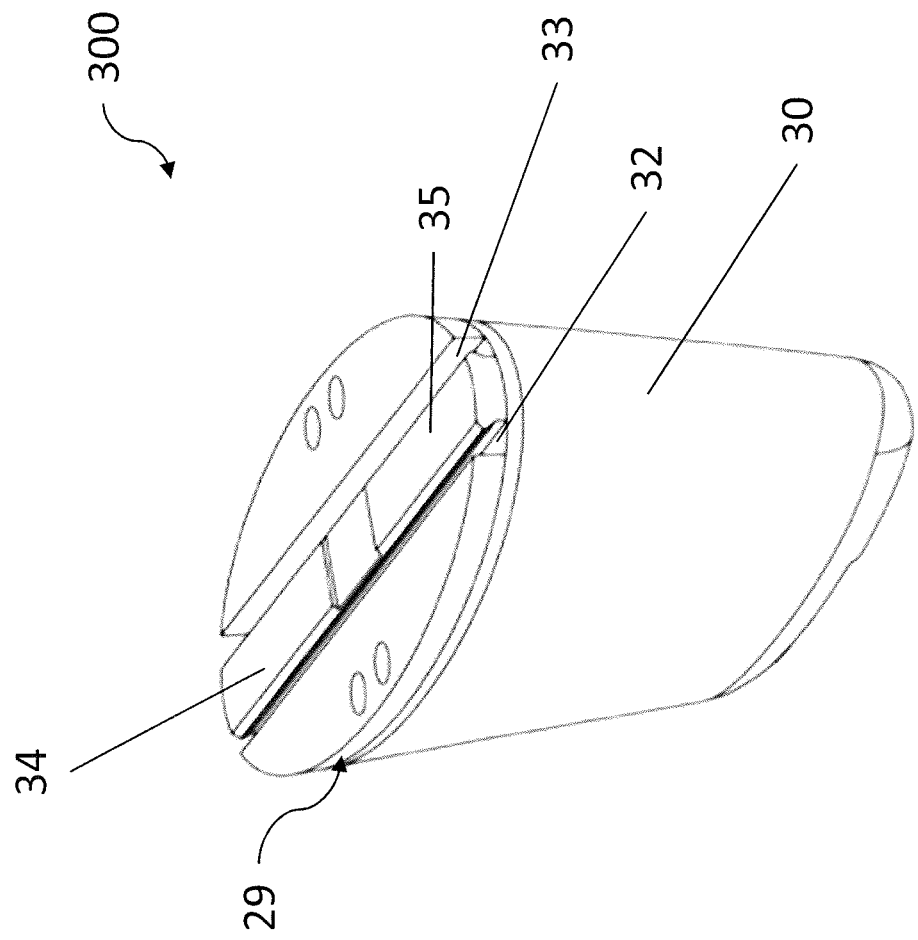
FIG. 8 shows an embodiment of a measurement unit.

FIG. 8 shows an embodiment of a measurement unit 300 according to an embodiment of the present disclosure. The measurement unit 300 comprises a body 30 having a top portion 31 configured to come into contact with bottom portion 6 of sleeve 100. In the top portion 31, fixing elements are provided in order to fix the measurement unit 300 onto the sleeve 100 in a removable manner. In the shown embodiment, the fixing elements comprise two channel-like recesses 32 and 33. Electrical terminals 34 and 35 are provided on top portion 31. The electrical terminals 34 and 35 are configured to electrically contact at least a first electrical contact electrically connected to the force sensor 7 and a second electrical contact electrically connected to the permittivity sensor 8. The first electrical contact and the second electrical contact might be comprised in the sleeve 100, for example in the bottom portion 6 thereof. Signals of the force sensor 7, the permittivity sensor 8 and the third sensor (e.g., the differential pressure sensor 26) can be supplied to the measurement unit 300 via electrical terminals such as terminals 34 and 35. For example, at least one terminal is provided for each of the sensors. A processing unit 37 comprised in the measurement unit 300 may be configured to determine whether the measurement unit 300 is connected to the sleeve 100 and/or whether the cap 200 is connected to the sleeve 100.

Figure 9:
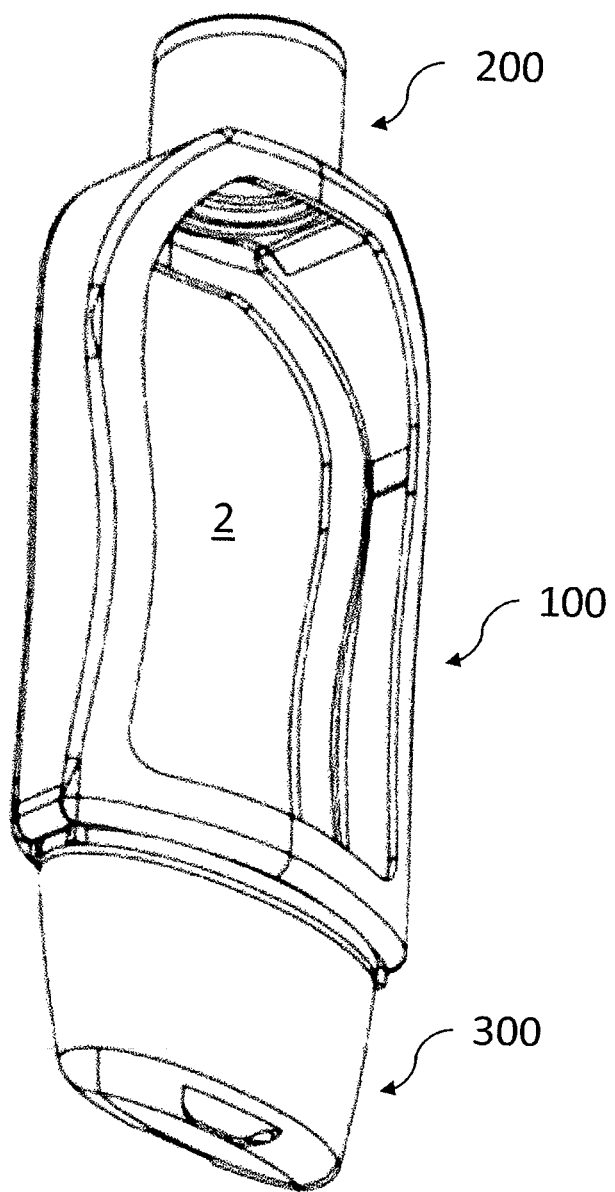
FIG. 9 shows an embodiment of a system comprising a cap, a sleeve and a measurement unit.

FIG. 9 shows an embodiment of a system according to an embodiment of the present disclosure. The system comprises the measurement unit 300, the sleeve 100 and the cap 200. The measurement unit 300 is removably coupled on the bottom portion 6 of sleeve 100. The cap 200 is removably coupled on the top portion 5 of the sleeve 100. In the shown configuration, no bottle is inserted in the opening 2. Fixing elements are provided between the sleeve 100 and the measurement unit 300 in order to removably couple the measurement unit 300 onto the sleeve 100. The fixing elements provided on the measurement unit 300 for example form a quick-fit connector system with corresponding fixing elements provided on the sleeve 100. Fixing elements are also provided between the sleeve 100 and the cap 200 in order to removably couple the cap 200 onto the sleeve 100. This enables a disassembly of the system shown in FIG. 9 into the measurement unit 300, the sleeve 100 and the cap 200. In order to insert a bottle into the opening 2, a user has to remove a cap from the bottle. Then, the user has to remove the cap 200 from the system shown in FIG. 9 and deform the sleeve 100 so that the bottle is encased by sleeve 100 in opening 2. Subsequently, the cap 200 will be mounted onto the sleeve 100, for example by screwing it onto a threading of the inserted bottle.

The sleeve 100 can be connected with the cap 200, with the cap 200 and the measurement unit 300 or only with the measurement unit 300. That is, a modular system is provided which enables replacement of the individual components. The system may also comprise the bottle. The measurement unit 300 and the cap 200 may be compatible with sleeves 100 of different sizes which fit different bottle sizes.

Figure 10:
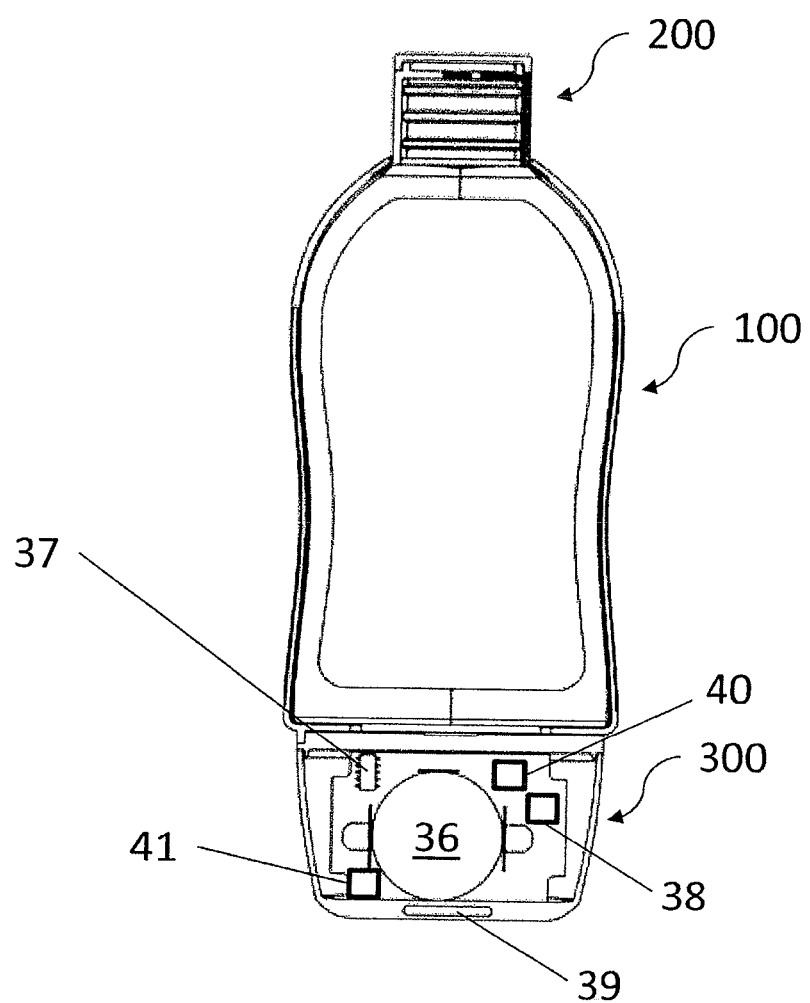
FIG. 10 shows a cross section of the embodiment of FIG. 9.

FIG. 10 shows an embodiment of the measurement unit 300 connected to sleeve 100 and cap 200 in a cross-sectional view. The measurement unit 300 of this embodiment includes an energy storage 36 such as a battery. It also includes a processing unit 37 configured to determine at least one parameter associated with the bottle encased by the sleeve 100 based on at least one of a first signal of the force sensor 7, and a second signal of the permittivity sensor 8. The measurement unit 300 may further comprise a fourth sensor 38 configured to measure an orientation of the measurement unit 300 and, thus, an orientation of the sleeve 100. The fourth sensor 38 may be an orientation sensor such as an acceleration sensor, for example a 3-axis acceleration sensor. In this case, the processing unit 37 may be configured to determine the at least one parameter associated with the bottle based on at least one of the first signal of the force sensor 7, the second signal of the permittivity sensor 8, and a fourth signal of the orientation sensor 38. If a third sensor (e.g., the differential pressure sensor 26) is included in the cap 200, the processing unit 37 may be configured to determine the at least one parameter based on at least one of the first signal of the force sensor 7, the second signal of the permittivity sensor 8, a third signal of the third sensor and a fourth signal of the orientation sensor 38.

The measurement unit 300 further comprises a signalling unit 39. The signalling unit 39 is configured to generate a signal perceptible by a user. For example, the signalling unit 39 is configured to generate a light signal, a vibration signal, an acoustic signal or any other signal detectable by a user. The signalling unit 39 is configured to generate a signal based on a control signal, wherein the processing unit 37 is configured to generate the control signal based on the at least one parameter. For example, if it is determined by the processing unit 37 that the bottle encased by the sleeve 100 is empty, a control signal can be generated by the processing unit. The control signal may activate a power supply from energy storage 36 to signalling unit 39. Upon activation of the power supply, signalling unit 39 may generate the signal. For example, based on the control signal, an acoustic signal may be generated by the signalling unit 39 (e.g., upon additionally detecting that a user presses the bottle).

In one example, the processing unit 37 is configured to generate a dataset comprising the at least one parameter. The dataset may further comprise additional information such as at least one of a timestamp, an event type, individual measurement values obtained by the force sensor 7, the permittivity sensor 8, the third sensor (e.g., the differential pressure sensor 26) or the orientation sensor 38, reference values for individual sensor signals and so on. The measurement unit 37 may further comprise a storage unit 40 configured to retrievably store multiple such datasets. The measurement unit 300 may further comprise an interface 41 configured to output the dataset, for example to a stationary base unit or to a mobile transponder in the vicinity of the measurement unit 300. In one example, the dataset is output in case the amount of data stored in the storage unit 40 exceeds a predetermined threshold. In another example, the dataset is output in case a signal of a base station is received. In a still further example, the dataset is output in case the at least one parameter corresponds to a predetermined parameter. Also, the dataset may be output in case the amount of electric power left in energy storage 36 falls under a predetermined threshold.

Figure 11:
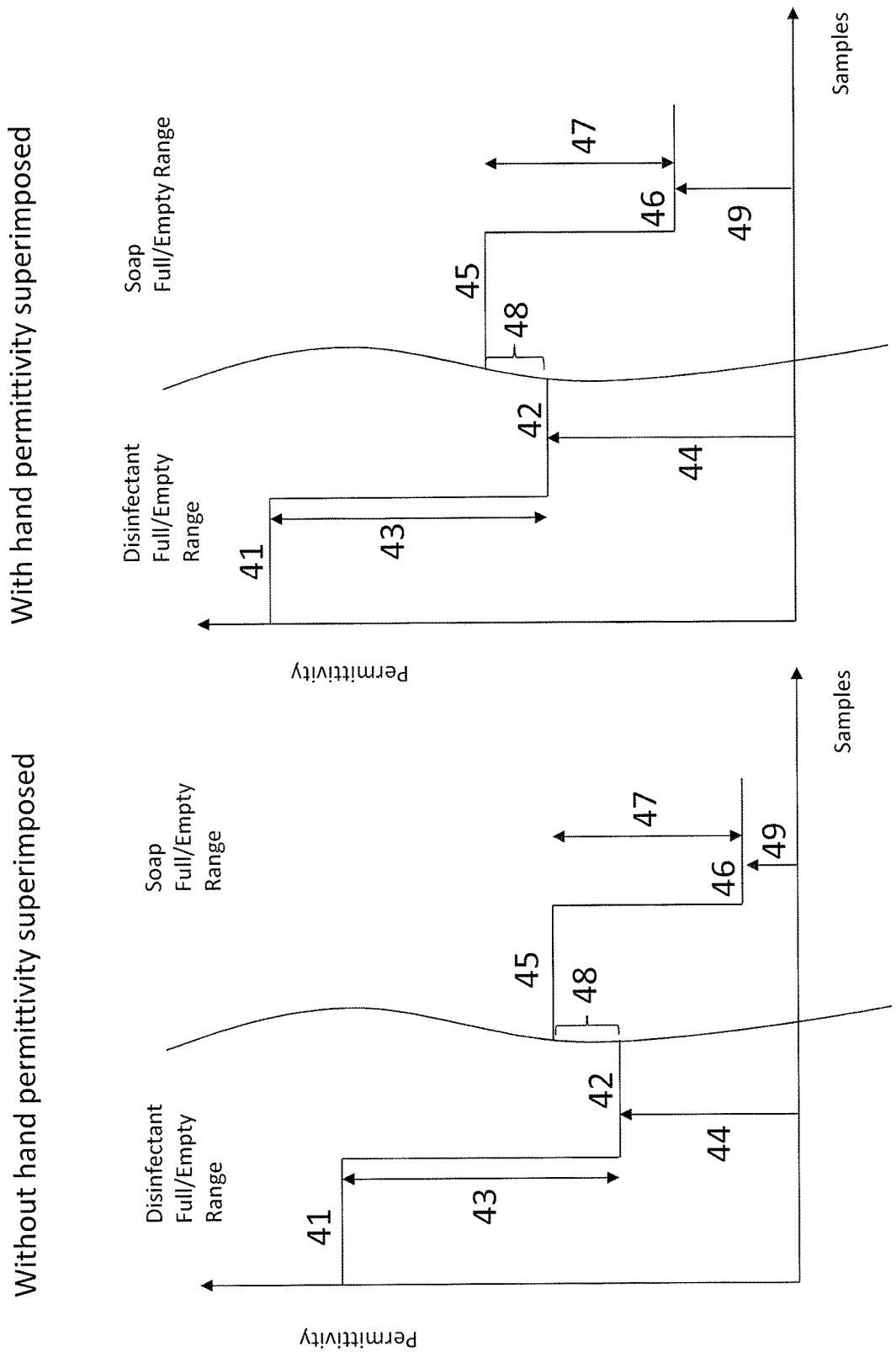
FIG. 11 shows exemplary measurement results of a second sensor.

FIG. 11 shows exemplary measurement results described by a second signal of one of the permittivity sensors 8 comprised in the sleeve 100. As noted above, each permittivity sensor 8 is configured to measure not only a permittivity of a first volume inside the sleeve 100 (as discussed in detail with reference to FIG. 18 and FIG. 19), but also a superimposed permittivity of a second volume outside the sleeve 100. Depending on whether a users' hand is present within the second volume outside the sleeve 100, a different total permittivity is measured. This means that the measured total permittivity differs when a user is holding the sleeve 100 or not.

On the left side in FIG. 11, an example of a measured permittivity without superimposed hand permittivity is shown. In this example, the sleeve 100 encasing the bottle might be placed on a table and not be contacted by a user's hand. As can be seen, the permittivity differs by a certain amount 43 between a permittivity 41 of a full bottle comprising disinfectant and a permittivity 42 of an empty disinfectant bottle. The permittivity also differs by a certain amount 47 between a permittivity 45 of a full bottle comprising soap and a permittivity 46 of an empty soap bottle. The reference signs 44 and 49 denote offsets from a reference permittivity which are characteristic for the two different bottle types. Same bottle types which are completely empty result in the same offset.

In the shown examples, in case a permittivity is measured which falls into an uncertainty range 48, a first parameter might be determined describing a content of the bottle being disinfectant and a second parameter might be determined describing a filling level of disinfectant being about 20%. In contrast thereto, for the same measured permittivity a third parameter might be determined describing a content of the bottle being soap and a fourth parameter might be determined describing a filling level of soap being 70% to 100%. That is, for permittivity values in the uncertainty range 48, ambiguities are possible with respect to the determined parameter(s).

By determining the frequency at which the highest permittivity is measured, a further parameter, namely the natural frequency, might be obtained. Depending on this additional parameter, the uncertainty might be minimised or avoided. That is, an ambiguity with respect to the at least one parameter may be minimized or avoided by determining additional parameters and comparing the determined parameters with one another. Also, sensor signals of the third sensor might be used to determine an additional parameter, for example a speed at which the fluid can flow outside of the bottle at a given force applied by a users' hand, the speed being correlated to the viscosity of the fluid. In addition, a fourth signal of the fourth sensor 38 may be used to avoid such ambiguities.

As shown on the right side in FIG. 11, the measured permittivity is larger in case a users' hand is present in the volume the permittivity of which is measured by the second sensor 8 outside the sleeve 100. That is, the permittivity of the users' hands is superimposed onto the permittivity of the content encased by the sleeve 100. Therefore, the shown offsets 44 and 49 are increased with respect to the illustration on the left side in FIG. 11. In the shown examples, the ranges 43 and 47 are approximately equal between the left and the right side of FIG. 11.

In order to determine permittivity values without the superimposed permittivity, a signal of the force sensor 7 can be used. For example, if it is determined by the force sensor 7 that a force is applied onto the sleeve 100, it can be determined that a user is pressing the sleeve 100. In this case, it can be determined that a users' hand is present adjacent to the sleeve 100 and that the superimposed permittivity caused by the users' hand is also measured. Then, the measured permittivity value might be reduced or increased by a predetermined amount. In other words, the signal of the force sensor 7 can be used to determine a condition depending on which the signal of the permittivity sensor 8 is corrected.

Figure 12:
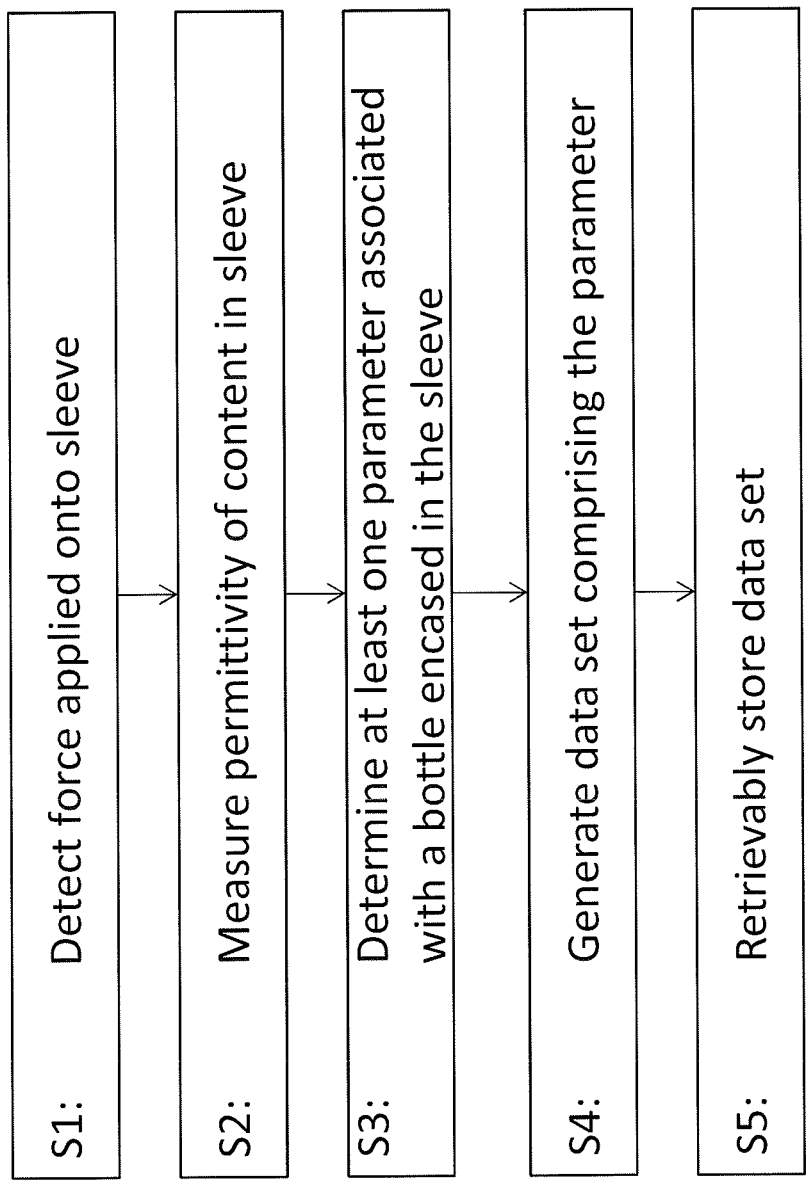
FIG. 12 shows a flow chart of a method embodiment.

FIG. 12 shows a flow diagram of a method embodiment. The method is for example executed by measurement unit 300. Some steps may be executed by force sensor 7 and permittivity sensor 8 as will be described below. In one variant, the method is executed by a system comprising the measurement unit 300 and the sleeve 100.

The method comprises a step S1 of detecting a force applied onto the sleeve 100, as a first signal. The detecting of the force is performed by the force sensor 7. The first signal is provided to the measurement unit 300. In a step S2, a permittivity of a content encased by the sleeve 100 is measured, as a second signal. The measurement of the permittivity is performed by the permittivity sensor 8. The second signal is provided to the measurement unit 300. The step S1 and the step S2 might also be conducted in reverse order or simultaneously.

Afterwards, a step S3 of determining the at least one parameter based on at least one of the first signal and the second signal is performed by processing unit 37 comprised in measurement unit 300. In a subsequent step S4, a dataset is generated by the processing unit 37, the dataset comprising the at least one parameter. In step S5, the dataset is stored retrievably by processing unit 37 in storage unit 40. As noted above, the step of determining the at least one parameter might comprise correcting the second signal based on the first signal.

Based on the first signal of the force sensor 7, it may be determined that the sleeve 100 is held in a hand of a user. The second signal of the permittivity sensor 8 may be used to verify this event. For example, the offset described above with reference to FIG. 11 is used to determine whether a superimposed permittivity is measured by the permittivity sensor 8 and thus also reflected in the second signal. In this example, the combination of the first signal of the force sensor 7 and the second signal of the permittivity sensor 8 are used to determine the at least one parameter which represents for example a state of use of the bottle encased by the sleeve 100 such as a user holding the sleeve 100.

The third sensor signal of the third sensor comprised in the cap 200 may be additionally used for verification. For example, the third sensor is configured to measure an amount of fluid disposed out of the bottle. This detection can then be compared with a parameter determined based on the first signal and the second signal.

The orientation sensor 38 comprised in the measurement unit 300 may be used to generate the fourth signal. This fourth signal may also be used for verification, correction or determination of the at least one parameter. In one example, the fourth sensor 38 may detect that the sleeve 100 is facing downwards with the top portion 5. It can be determined that no liquid is being dispensed in case the sleeve 100 is facing upwards with the top portion 5.

In other words, signals of multiple different sensors may be used in order to determine multiple parameters based on which the event can be determined. Several parameters such as an orientation of the sleeve 100, a force applied onto the sleeve 100, an amount of fluid per time being disposed through cap 200 and else may be determined using the signals. The individual parameters may then be compared with one another in order to determine an additional parameter such as a parameter indicating that the sleeve is held in a user's hand or a parameter indicating an orientation of the sleeve. Multiple parameters can then be compared with predetermined parameter values associated with certain events in order to determine an event. Such an event may be a use event describing that the bottle encased by the sleeve has been used to dispense liquid, a calibration event describing that the sleeve is in a calibration condition, a false positive event describing that some parameters indicate a use event while others do not, or else.

In case no bottle is encased by the sleeve 100 and the sleeve 100 is not held by a users' hand, the measured permittivity corresponds mainly to the permittivity of air. It may correspond to a predetermined reference permittivity which might be stored in the storage unit 40. For calibrating the permittivity sensor 8, no bottle is inserted in the sleeve 100 and the sleeve 100 is not held by a users' hand. In this case, the calibration event can be determined based on the signals of the force sensor 7 and the permittivity sensor 8. In particular, the signal of the force sensor 7 indicates that no pressure is applied onto the sleeve 100 and the signal of the permittivity sensor 8 indicates that air is present in the hole 2 in the sleeve 100. After the calibration event is determined, the permittivity is measured and compared to the reference permittivity in order to calibrate the permittivity sensor 8. For calibration, only permittivity values of a selection of electrode segments of permittivity sensor 8 may be used such as electrodes 15 and 16.

An insertion of a bottle into the sleeve 100 will be detected using the second signal. In this case, the second signal may be generated by a selection of electrode segments of permittivity sensor 8 such as electrodes 15 and 16. A comparison of permittivity values before and after insertion of the bottle with predetermined permittivity values enables determining whether a bottle is encased by the sleeve 100 or not.

After the insertion, the type of liquid inside the bottle may be determined by measuring permittivity of the content encased by the sleeve 100 over a given frequency range. Also for this measurement, a selection of electrode segments of permittivity sensor 8 such as electrodes 15 and 16 may be used. The frequency at which the permittivity is the highest is chosen as natural frequency and compared with a predetermined natural frequency associated with a certain liquid and/or bottle type. Depending on the comparison, the type of liquid in the bottle and the bottle type such as a bottle material and a bottle thickness can be determined.

Additionally, the filling level may be determined using segmented second electrodes 12, 13 of the second sensor 8 as described above. In particular, the measured permittivity values are compared with predetermined permittivity values of bottles having a given filling level. This enables a determination of the filling level. Different permittivity values of electrode segments may be used to measure multiple permittivity values and to compare these with predetermined permittivity values in order to determine the filling level of the bottle.

The additional method steps shown in FIGS. 13 to 17 may be part of the method of discussed above with reference to FIG. 12. The same applies to the individual steps mentioned with reference to FIG. 11. The processing unit 37 may be configured to execute one or more of the steps described above with reference to FIG. 11. The processing unit 37 may also be configured to execute one or more of the steps described in the following with reference to FIGS. 13 to 17.

In order to collect data describing events of a bottle encased in sleeve 100 (which data can be used by other devices such as a base unit), a certain type of dataset is determined by processing unit 37. Such datasets are shown in FIG. 17 as will be described below.

Figure 13:
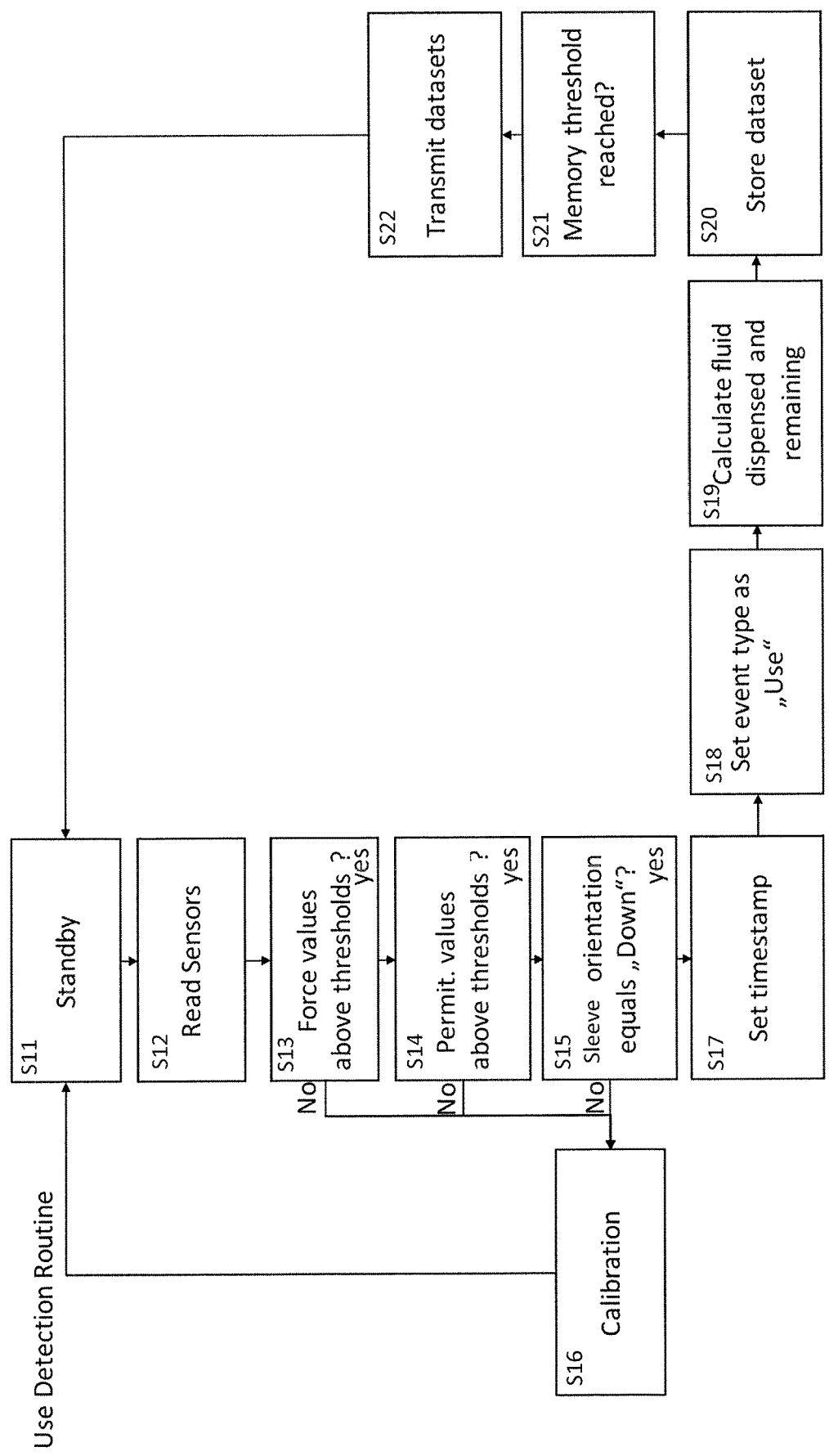
FIG. 13 shows a flow chart of a method embodiment to determine an event.

FIG. 13 shows an embodiment of a generation of one dataset. As shown in FIG. 13, the processing unit 37 initially assumes a standby mode in step S11. Subsequently, the individual sensors are read out in step S12. That is, signals of the individual sensors, such as at least of force sensor 7, permittivity sensor 8 and orientation sensor 38, are received by the processing unit 37. Afterwards, the signals of the individual sensors are compared with predetermined thresholds, by the processing unit 37, in steps S13, S14 and S15. It is determined whether the force values measured by two force sensors 7 are above first thresholds in step S13, whether the permittivity values measured by two second sensors 8 are above second thresholds in step S14 and whether the orientation of the sleeve 100 which is obtained using the orientation sensor 38 equals a predetermined direction in step S15. In the shown example, it is determined whether the sleeve orientation equals "Down" which corresponds to an orientation in which the top portion 5 of the sleeve 100 is pointing downwards towards the floor. The first thresholds may be identical and also the second thresholds may be identical. Depending on the comparisons, either a calibration is performed by processing unit 37 in step S16, as will be described later, or a timestamp for a new dataset is set by processing unit 37 in step S17. Afterwards, an event is determined by processing unit 37 based on the sensor signals in step S18, for example a use event which indicates a dispensing of liquid from the bottle.

The amount of fluid dispensed and the amount of remaining fluid are then calculated by processing unit 37 in step S19. To this end, a third sensor signal of the third sensor is used to determine the amount of fluid dispensed. This amount may then be subtracted from a stored amount of liquid in the bottle before the dispensing. Instead or in addition to the third sensor signal, the second signal of permittivity sensor 8 may be used to determine an amount of remaining fluid. In particular, in case of a known liquid in the bottle, certain permittivity values can be associated with certain filling levels. The determination of a filling level before and after the dispensing can be used to determine an amount of dispensed fluid. This determination of a filling level based on the second signal of the permittivity sensor 8 will also be described in detail with reference to FIG. 14.

The amounts determined based on the second signal and based on the third signal may be compared by processing unit 37 and a feasible one may be selected. Alternatively, the amounts may be averaged in order to determine the amount of fluid dispensed and the amount of remaining fluid.

A dataset containing the associated parameters is then generated and retrievably stored by processing unit 37 in step S20. As also shown in FIG. 17, the dataset 50 comprises the use event, the calculated amount of dispensed and remaining fluid, the forces measured by the force sensors 7, the permittivities measured by the permittivity sensors 8 and the orientation determined using the orientation sensor 38. The dataset is stored retrievably in data storage 40.

In case a memory threshold is reached as determined in step S21, which can be determined by processing unit 37, the datasets are transmitted by interface 41 to a base unit in step S22. The datasets may be obtained by a based unit over interface 41.

Figures 14, 15:
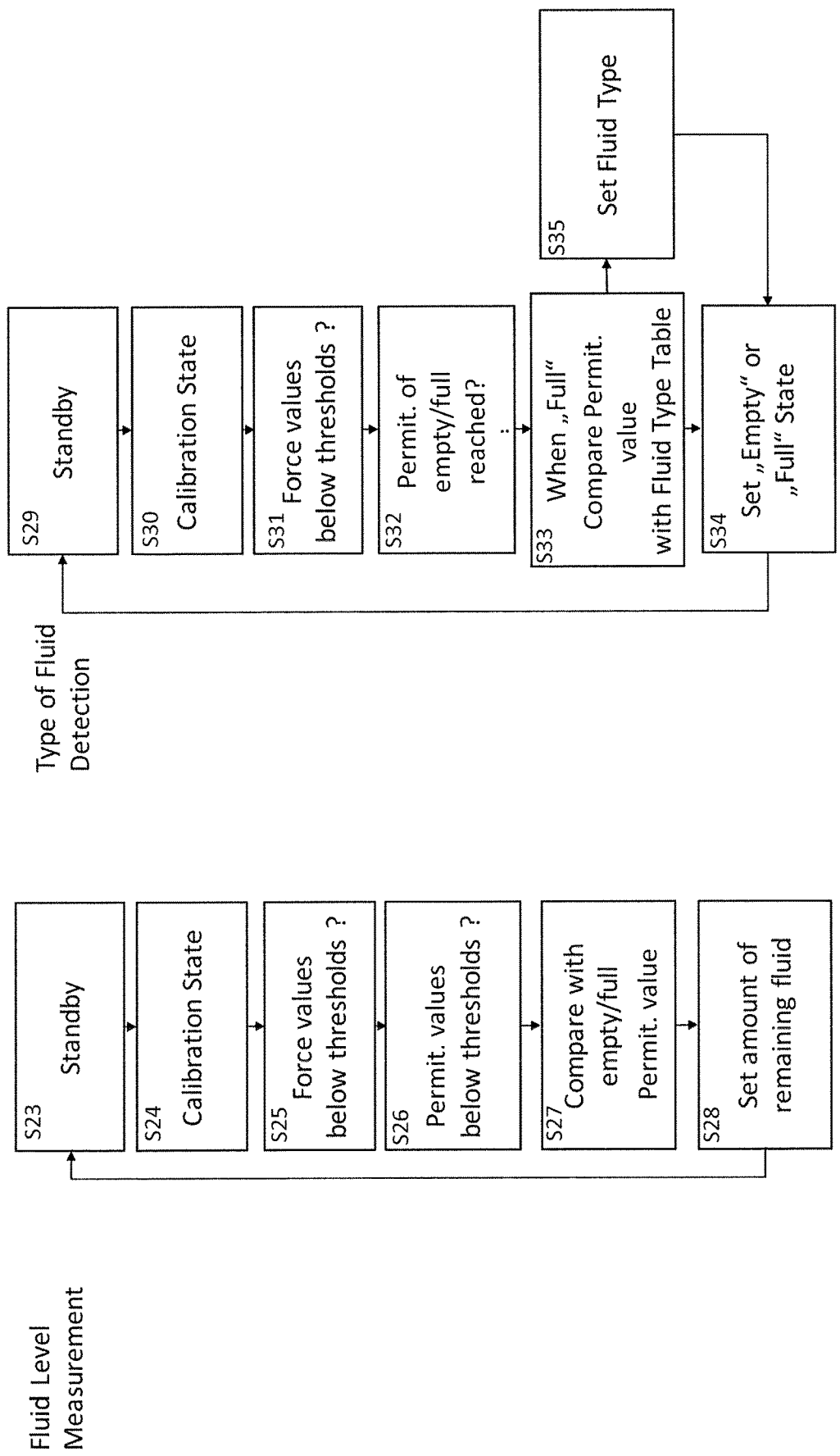
FIG. 14 shows a flow chart of a method embodiment to determine a fluid level in a bottle.
FIG. 15 shows a flow chart of a method embodiment to determine a type of fluid in a bottle.

FIG. 14 shows how an amount of fluid in a bottle is determined by processing unit 37. This sequence can also be referred to as "Calibration" and may thus correspond to step S16 shown in FIG. S16. In step S23, the processing unit 37 is in a standby mode. Afterwards, in step S24, processing unit 37 determines a "Calibration state" as the event. After this event has been determined, subsequent steps S25 to S27 can be performed. In step S25, it is determined by processing unit 37 whether force values derived from the first signals of two force sensors 7 lie below predetermined force thresholds. In step S26 it is determined by processing unit 37 whether permittivity values derived from the second signals of the two permittivity sensors 8 lie below predetermined permittivity thresholds. If both conditions are fulfilled, in step S27, the measured permittivities are compared, by the processing unit 37, with a predetermined permittivity model of a bottle comprising a certain liquid, wherein the permittivity model at least includes permittivity values of an empty bottle and a full bottle. Based on the comparison, the amount of fluid in the bottle can be determined, by the processing unit 37, in step S28. In the shown example, this amount of fluid is referred to as "amount of remaining fluid". The determined amount of fluid as one parameter is then stored together with additional information, such as a timestamp and the measured forces and permittivities, as dataset 51 in storage unit 40. This dataset 51 also includes a parameter indicating that during measurement, the sleeve 100 was in an upright position and force measurement values indicating that the sleeve 100 was not contacted by a users' hand.

FIG. 15 shows how the type of fluid in a bottle is determined by processing unit 37. This sequence can also be referred to as "Calibration" and may thus correspond to step S16 shown in FIG. S16. In step S29, the processing unit 37 is in a standby mode. Afterwards, in step S30, processing unit 37 determines a "Calibration state" as the event. After this event has been determined as the event, subsequent steps S31 to S35 can be performed. In step S31 it is determined by processing unit 37 whether force values derived from the first signals of the two sensors 7 lie below predetermined thresholds. In step S32 it is determined by the processing unit 37 whether permittivity values derived from the second signals of the two permittivity sensors 8 lie in a predetermined range. In case the permittivity values enable a determination that a full bottle is present in the sleeve 100, the permittivity values are compared by the processing unit 37 with predetermined reference values correlated with certain fluids in step S33. The predetermined reference values are correlated with certain fluids in a "Fluid Type Table". Based on the comparison of step S33, the processing unit 37 determines the type of fluid present in the bottle in step S35. In addition, the state of the bottle such as a full state or an empty state can be determined by processing unit 37 in step S34 based on the comparison of step S32. The determined fluid type and the determined state of the bottle may then be stored by processing unit 37 together with additional information such as a timestamp as a dataset 51 in storage unit 40. This dataset may also include a parameter indicating that during measurement, the sleeve 100 was in an upright position and further include force measurement values as parameters indicating that the sleeve 100 was not contacted by a users' hand.

Figure 16:
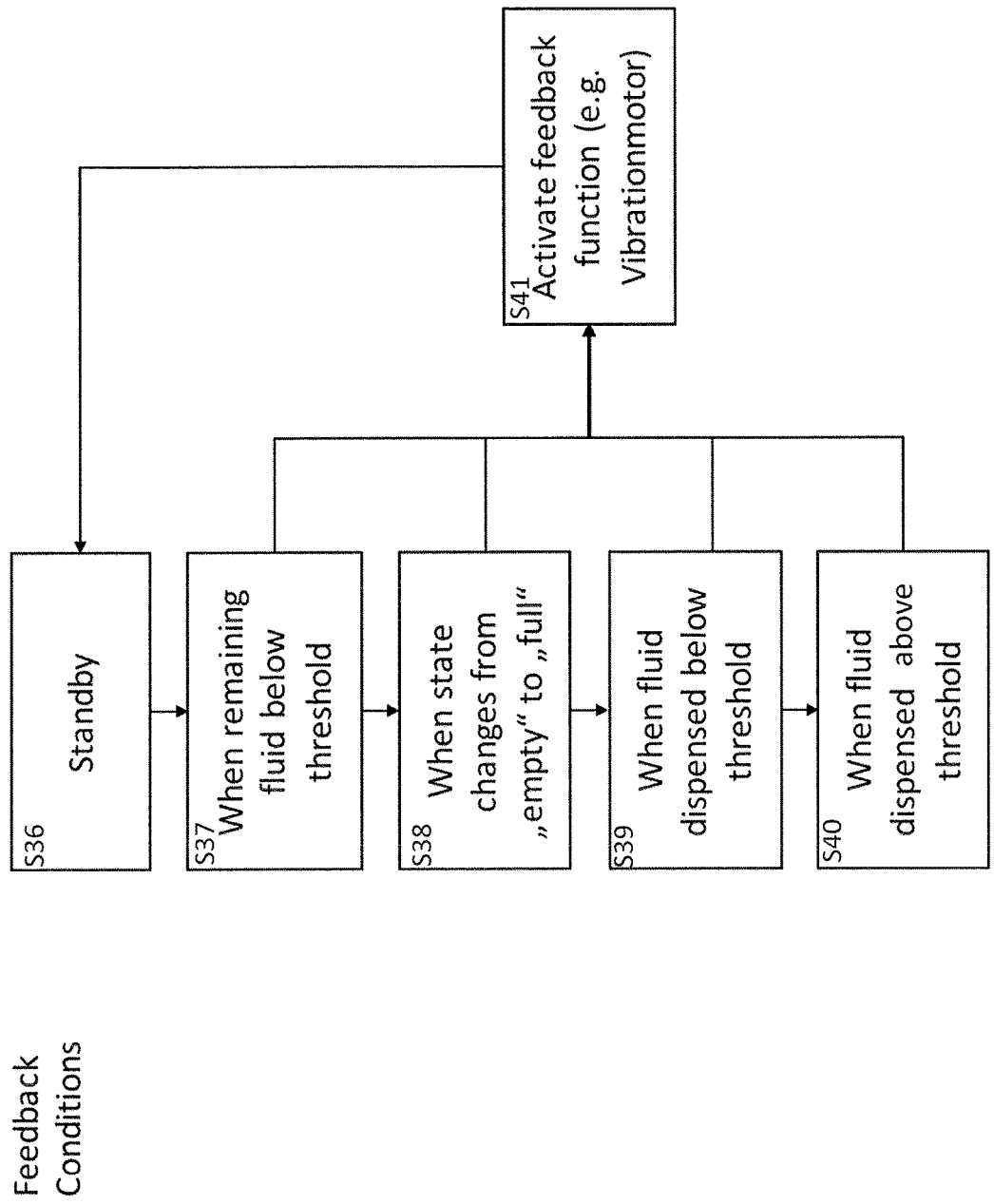
FIG. 16 shows a flow chart of a method embodiment to generate a perceivable signal.

FIG. 16 shows examples of when the signaling unit 39 outputs a perceivable signal to a user. In step S36, the processing unit 37 is in a standby state. In step S37 it is determined whether the amount of fluid inside the bottle, here referred to as "remaining fluid", falls below a predetermined threshold. In step S38, it is determined whether the state of the bottle changes from an empty state to a full state, for example in case a new bottle is inserted into the sleeve 100 or in case the bottle has been refilled. In step S39, it is determined whether the amount of fluid dispensed during a use event is below a first predetermined threshold. In step S40 it is determined whether the amount of fluid dispensed during a use event is above a second predetermined threshold, for example above 3 ml. A minimum amount of 3 ml of disinfectant is recommended by the WHO in order to reliably disinfect two hands. In case the determination in one of steps S37 to S40 results in a positive result, namely in case the condition of one of the steps S37 to S40 is fulfilled, a signal perceivable by a user is generated in step S41. The processing unit 37 may be configured to determine whether one or more of the aforementioned conditions is fulfilled and generate a corresponding control signal for the signaling unit 39.

FIG. 17 shows three separate datasets 50, 51, 52 in three different rows. The datasets have been determined by the processing unit 37 and stored in storage unit 40. Each of the datasets 50, 51, 52 comprises a timestamp, a device ID, a signal of the first force sensor 7, a signal of the second force sensor 7, a signal of the first permittivity sensor 8, a signal of the second permittivity sensor 8, a first parameter determined based on the signal of the permittivity sensor 8 and the additional permittivity sensor 8 and describing a state of the bottle ("Permittivity Sensor Empty/Full/Used"), a parameter indicating a fluid type, a parameter indicating the amount of dispensed fluid, a parameter indicating the amount of fluid left in the bottle, a parameter indicating the orientation of the sleeve 100, and an event attributed to the data set. The event may be used in order to select one or more of a plurality of data sets based on the event. For example, all data sets attributed by a use event may be selected. That is, the event may be stored as an individually identifiable entity separate from the plurality of parameters in the dataset but at the same time correlated to the plurality of parameters. For example, the event type is specified in metadata of the dataset.

The first dataset 50 includes an event associated with the bottle which is a use event. In this state, liquid is dispensed out from the bottle. The first signals of 1300 mV of force sensors 7 indicate a large force which indicates that a user presses the sleeve 100. In addition, the second signals of 55 pF of permittivity sensors 8 correspond to a large permittivity which indicates that a superimposed permittivity of a hand of the user holding the sleeve 100 is measured. The dispensed fluid amount might be determined based on the signal of the third sensor comprised in the cap 200 and/or based on differences in the permittivities measured before and after dispensing of a liquid. The orientation of the nozzle corresponds to the orientation of the sleeve 100 as determined based on a signal of the orientation sensor 38 comprised in the measurement unit 300. Since the first signals and the second signals as well as the determined orientation of the nozzle and the determined amount of dispensed liquid consistently indicate a dispensing of liquid from the bottle, the event can be determined reliably as being a use event.

In the second dataset 51, an event is determined as being a "calibration state". This is because the first signals of 0 mV indicate that the sleeve is not pressed and the fourth signal allows determination that the sleeve is oriented with the top portion 5 facing upwards. In this shown example, the permittivities of the second signals (15 pF and 16 pF) differ from one another. The calibration may be used in order to apply an offset onto the second signals so that they equal one another and/or so that they equal a predetermined permittivity value.

The third dataset 52 indicates an event named as "false positive". In this case, one of the first signals (1300 mV) indicates a large force, whereas the additional first signal (100 mV) indicates a much lower force. In addition, it is determined that the sleeve 100 is oriented with the top portion 5 facing sideward, for example using the fourth signal. The second signals indicate small permittivity values (17 pF and 16 pF) which mean that no hand of a user is present adjacent to the sleeve 100. Due to the different forces indicated by the first signals and due to the low permittivities indicated by the second signals, it can be determined that no liquid has been dispensed at this point in time. In other words, a false positive detection can be avoided.

FIG. 18 shows an embodiment of a system comprising the sleeve 100 and a bottle 400 encased by the sleeve 100. The sleeve 100 and the bottle 400 are illustrated schematically. The sleeve 100 corresponds to the sleeve 100 described above with reference to FIG. 1 to FIG. 3. The system may further comprise the cap 200 described above with reference to FIG. 4 to FIG. 7. The system may further comprise the measurement unit 300 as described above with reference to FIG. 8 to FIG. 10.

The two second electrodes 12, 13 of the permittivity sensor 8 are spaced apart from one another by a gap. In the shown example, the gap is filled with strip 14 of an insulting material such as air. On the two second electrodes 12, 13 a layer of material 53 is disposed. In the shown embodiment this material is the same as a material of the sleeve 100. The two second electrodes 12, 13 and the strip 14 may therefore be molded into the sleeve 100. The two second electrodes 12, 13 are arranged on a substrate 18 made of a deformable material. The bottle 400 comprises a liquid 54 such as a disinfectant. In case an electric voltage drop is applied across the two second electrodes 12, 13, an electric field 55 forms between the two second electrodes 12, 13. The electric field 55 extends into the fluid 54 comprised in the bottle 400. The electric field 55 extends into the first volume described above with reference to FIG. 2 and FIG. 11. The electric field 55 is influenced by a permittivity of the layer of material 53, a permittivity of a side of bottle 400 and a permittivity of the fluid 54. The electric field 55 can therefore be used to measure a permittivity of the fluid 55.

FIG. 19 shows an embodiment of a system comprising the sleeve 100 and a bottle 400 encased by the sleeve 100. In this embodiment, two permittivity sensors 8 are arranged on opposite sides of the bottle 400 encased by the sleeve 100. The sleeve 100 corresponds to the sleeve 100 described above with reference to FIG. 1 to FIG. 3. The system may further comprise the cap 200 described above with reference to FIG. 4 to FIG. 7. The system may further comprise the measurement unit 300 as described above with reference to FIG. 8 to FIG. 10.

Each of the two permittivity sensors 8 comprises second electrodes 12, 13 disposed on substrate 18 and covered by a layer of material 53. Between the two second electrodes 12, 13 of a permittivity sensor 8 on one side of the bottle 400, the electric field 55 is formed. The electric field 55 extends into the first volume described above with reference to FIG. 2 and FIG. 11. Between the two second electrodes 12, 13 of the other permittivity sensor 8 on the other side of the bottle 400, an electric field 56 is formed. The electric field 56 extends into the first volume described above with reference to FIG. 2 and FIG. 11. As can be seen in FIG. 19, the two second electrodes 12, 13 of each permittivity sensor 8 are controlled such that the electric field 55 and the electric field 56 are oriented in opposite directions. In other words, the electric fields 55, 56 generated for measuring the permittivity of the liquid 54 inside the bottle 400 run into opposing directions in a central region 57 of the bottle 400. As in the case of the system shown in FIG. 18, the electric field 55 is influenced by a permittivity of the layer of material 53, a permittivity of a side of bottle 400 and a permittivity of the fluid 54. In addition, the electric field 56 is influenced by a permittivity of the layer of material 53, a permittivity of a side of bottle 400 and a permittivity of the fluid 54. Last but not least, the permittivity sensors 8 can be controlled such that the electric field 55 influences the electric field 56 and vice versa.

The provision of a sleeve according to the present disclosure enables the determination of two physical parameters. In particular, a force applied onto the sleeve and a permittivity of a content of the sleeve and of a volume outside the sleeve can be measured. These measurements enable a reliable determination of at least one parameter associated with the bottle, for example an event such as a use of the bottle to dispense liquid out of the bottle. This parameter can then be used to track the behavior of a user of the bottle. Also, a filling state of the bottle can be determined and a user can be provided with an alert signal in case the bottle is (almost) empty, in case the amount of fluid dispensed exceeds a maximum amount or in case the amount of fluid dispensed is below a minimum amount. That is, the provided sleeve enables an improved use behavior of a user using the bottle encased by the sleeve.

The determination of the at least one parameter may be performed by a measurement unit attachable to the sleeve. In order to accommodate for bottles of different sizes, sleeves with different sizes may be provided. The measurement unit is for example attachable to these sleeves having different sizes. This enables tracking of a behavior of a user who is associated with a certain measurement unit, independent from the sleeve used. Also, an easy replacement of the measurement unit is possible, for example in case of an empty battery. As described above, these advantages enable an improved use behavior of a user using the bottle encased by the sleeve.

Additional sensors may be provided in a cap attachable onto the sleeve and in the measurement unit. These sensors may also be used to determine the at least one parameter. In general, the more different sensors are used, the more reliable can an event such as a use of the bottle to dispense liquid be determined.

The at least one parameter is retrievably stored together with additional information as a dataset. The dataset can then be transmitted to a base station. The base station may therefore collect datasets from multiple measurement units associated with different users, which enables tracking of a use behavior of different users.

The invention claimed is:

1. A sleeve configured to at least partially encase a bottle from which a liquid is dispensable upon pressing the sleeve, the sleeve being made from a deformable material and comprising:
   a first sensor configured to measure a force applied onto the sleeve by a user's hand when the user is deforming the sleeve so as to dispense the liquid from the bottle; and
   a second sensor configured to measure a permittivity of a content encased by the sleeve.

2. The sleeve of claim 1, wherein
the first sensor is further configured to measure the force applied onto the sleeve by the user's hand when the user is holding the sleeve in the hand.

3. The sleeve of claim 1, wherein
the first sensor comprises two first electrodes separated from one another by a gap, the two first electrodes extending in a height direction of the sleeve.

4. The sleeve of claim 3, wherein
the first sensor comprises a conductive sheet arranged on top of the two first electrodes, wherein the conductive sheet is configured so as to come in contact with the two first electrodes in case the force applied to the sleeve exceeds a predetermined minimum force.

5. The sleeve of claim 1, wherein
the second sensor comprises two second electrodes spaced apart from one another.

6. The sleeve of claim 5, wherein
the two electrodes are arranged on an inner surface of the sleeve such that they are configured to contact a side portion of the bottle encased by the sleeve.

7. The sleeve of claim 5, wherein
at least one of the two electrodes is segmented in a height direction of the sleeve into at least two electrode segments.

8. The sleeve of claim 1, further comprising:
a cap configured to close the bottle when the bottle is encased by the sleeve.

9. The sleeve of claim 8, wherein
the cap comprises at least one third sensor configured to measure a parameter associated with an amount of the liquid dispensed from the bottle through the cap.

10. A measurement unit configured to be mounted on a sleeve, the sleeve configured to at least partially encase a bottle from which a liquid is dispensable upon pressing the sleeve, the sleeve being made from a deformable material and comprising (a) a first sensor configured to measure a force applied onto the sleeve by a user's hand when the user is deforming the sleeve so as to dispense the liquid from the bottle and (b) a second sensor configured to measure a permittivity of a content encased by the sleeve, the measurement unit comprising:
   electrical terminals configured to electrically contact at least a first electrical contact electrically connected to the first sensor and a second electrical contact electrically connected to the second sensor; and
   a processing unit configured to determine at least one parameter associated with the bottle based on at least one of a signal of the first sensor and a signal of the second sensor.

11. The measurement unit of claim 10, further comprising a fourth sensor, wherein the processing unit is configured to determine the at least one parameter associated with the bottle based on at least one of the signal of the first sensor, the signal of the second sensor and a signal of the fourth sensor.

12. The measurement unit of claim 11, wherein
the fourth sensor is configured to measure an orientation of the sleeve.

13. The measurement unit of claim 10, wherein
the processing unit is configured to generate a dataset comprising the at least one parameter, the measurement unit further comprising a storage unit configured to retrievably store the dataset.

14. The measurement unit of claim 13, further comprising an interface configured to output the dataset.

15. A method of storing at least one parameter associated with a bottle encased in a sleeve, the sleeve configured to at least partially encase the bottle from which a liquid is dispensable upon pressing the sleeve, the sleeve being made from a deformable material and comprising (a) a first sensor configured to measure a force applied onto the sleeve by a user's hand when the user is deforming the sleeve so as to dispense the liquid from the bottle and (b) a second sensor configured to measure a permittivity of a content encased by the sleeve, the method comprising at least one of:
   i) measuring, as a first signal, the force applied onto the sleeve, by the user's hand when the user is deforming the sleeve so as to dispense the liquid from the bottle, and
   (ii) measuring, as a second signal, the permittivity of the content encased by the sleeve;
   wherein the method further comprises:
   determining the at least one parameter based on at least one of the first signal and the second signal;
   generating a dataset comprising the at least one parameter; and
   retrievably storing the dataset.

16. The method of claim 15, further comprising correcting the second signal based on the first signal.

17. The method of claim 15, performed by a measurement unit configured to be mounted on the sleeve, the measurement unit comprising:
   electrical terminals configured to electrically contact at least a first electrical contact electrically connected to the first sensor and a second electrical contact electrically connected to the second sensor; and
   a processing unit configured to determine the at least one parameter and to generate the dataset.

* * * * *